(12) United States Patent  (10) Patent No.: US 8,684,531 B2
Mashitani et al.  (45) Date of Patent: Apr. 1, 2014

(54) STEREOSCOPIC DISPLAY DEVICE PROJECTING PARALLAX IMAGE AND ADJUSTING AMOUNT OF PARALLAX

(75) Inventors: Ken Mashitani, Hirakata (JP); Masutaka Inoue, Hirakata (JP); Hideyuki Kanayama, Uji (JP); Takashi Ikeda, Higashi Osaka (JP); Takahisa Ando, Ikoma (JP); Kazuhiro Arai, Daito (JP); Ryuhei Amano, Hirakata (JP)

(73) Assignee: Vision3D Technologies, LLC, Mountian View, CA (US)

( * ) Notice: Subject to any disclaimer, the term of this patent is extended or adjusted under 35 U.S.C. 154(b) by 345 days.

(21) Appl. No.: 12/979,423

(22) Filed: Dec. 28, 2010

(65) Prior Publication Data

US 2011/0157555 A1  Jun. 30, 2011

(30) Foreign Application Priority Data

Dec. 28, 2009  (JP) .................................. 2009-298580
May 17, 2010  (JP) .................................. 2010-113381

(51) Int. Cl.
*G03B 21/00* (2006.01)
*G02B 27/22* (2006.01)
*G02B 27/24* (2006.01)
*H04N 9/47* (2006.01)
*H04N 13/00* (2006.01)
*H04N 13/04* (2006.01)

(52) U.S. Cl.
USPC ............... 353/7; 359/462; 359/471; 359/473; 348/42; 348/44; 348/51; 348/54

(58) Field of Classification Search
USPC .......... 353/7–9; 359/462, 464–467, 471–473, 359/475–477; 348/42, 44, 51, 53–55, 348/57–58, 60; 349/15
See application file for complete search history.

(56) References Cited

U.S. PATENT DOCUMENTS

| 4,650,282 | A | * | 3/1987 | Lo .................................. 359/462 |
| 4,807,965 | A | * | 2/1989 | Garakani ...................... 359/464 |
| 5,726,704 | A | * | 3/1998 | Uomori ........................... 348/47 |
| 5,801,760 | A | * | 9/1998 | Uomori ........................... 348/47 |
| 5,982,342 | A | | 11/1999 | Iwata et al. |
| 6,313,866 | B1 | * | 11/2001 | Akamatsu et al. ............... 348/51 |
| 7,605,776 | B2 | * | 10/2009 | Satoh et al. ....................... 345/9 |
| 2006/0050338 | A1 | * | 3/2006 | Hattori ............................ 359/9 |
| 2011/0157330 | A1 | * | 6/2011 | Bennett et al. .................. 348/54 |
| 2011/0188106 | A1 | * | 8/2011 | Bae et al. .................... 359/226.3 |
| 2012/0263372 | A1 | * | 10/2012 | Adachi et al. ................. 382/154 |

FOREIGN PATENT DOCUMENTS

| JP | H09-107564 A | 4/1997 |
| JP | H10-056654 A | 2/1998 |
| JP | H10-240212 A | 9/1998 |
| JP | H11-341517 A | 12/1999 |
| JP | 2004-180069 A | 6/2004 |
| JP | 2004-228824 A | 8/2004 |
| JP | 2004-334833 A | 11/2004 |
| JP | 2005-110120 A | 4/2005 |
| JP | 2006-072455 A | 3/2006 |
| JP | 2006-215147 A | 8/2006 |
| JP | 2010-98479 A | 4/2010 |

* cited by examiner

*Primary Examiner* — Tony Ko
*Assistant Examiner* — Jori S Reilly-Diakun
(74) *Attorney, Agent, or Firm* — DC Patent Lawyers, PLLC

(57) ABSTRACT

An image signal storing unit stores an image signal provided from the outside. An image processing unit appropriately processes the image signal stored in the image signal storing unit in accordance with the instruction from an adjusting unit. A projecting unit projects, onto a display area, light corresponding to an image created by the image processing unit. A display size determination unit computes the display size of the picture plane displayed on a screen based on an image captured by the camera provided adjacent to the projection-type video-image display device. The display size determination unit then determines whether or not the display size of the picture plane is equal to or larger than a predetermined upper-limit size.

7 Claims, 32 Drawing Sheets

FIG.10
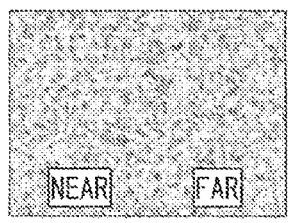
FIG.10A
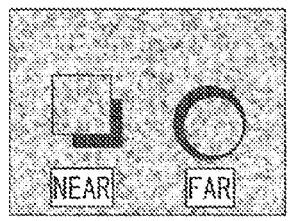
FIG.10B
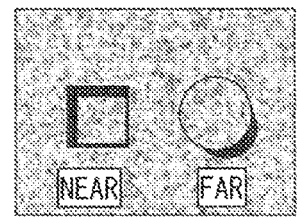
FIG.10C
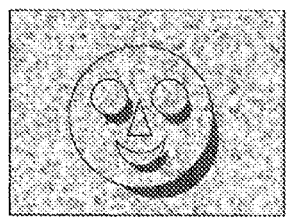
FIG.10D
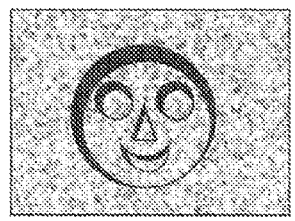
FIG.10E FIG.15
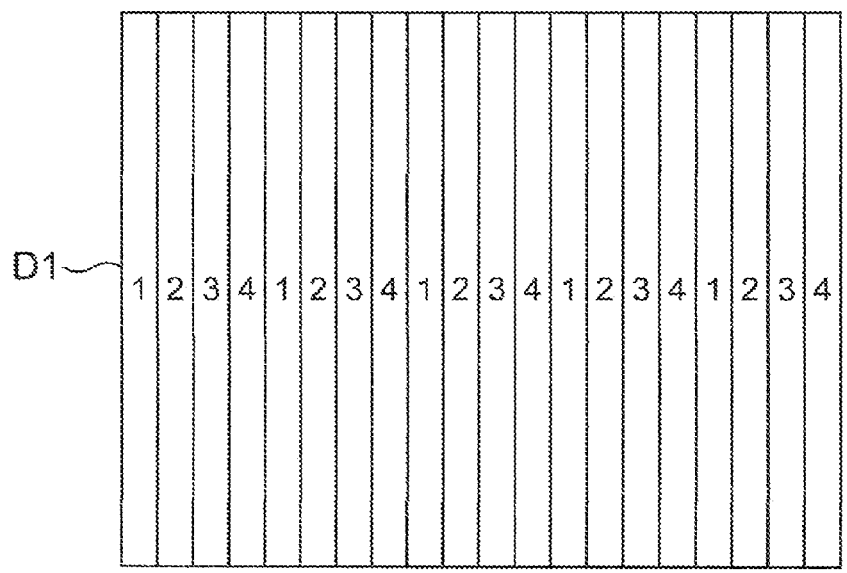
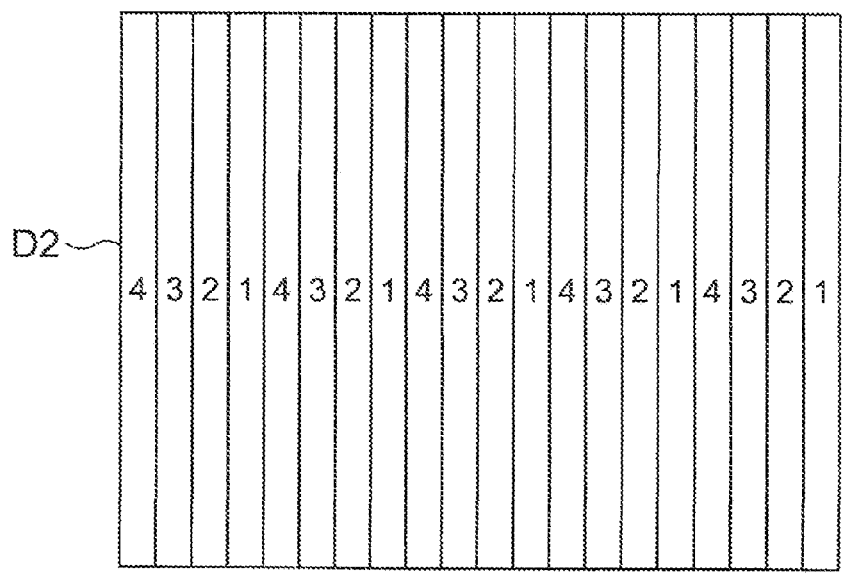

FIG.28A
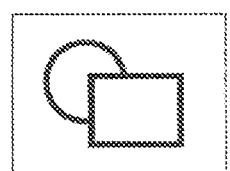
IR
FIG.28B
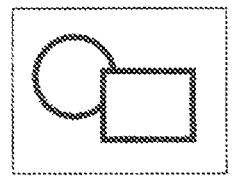
IL
FIG.28C
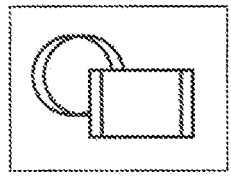
IC
FIG.28D
 1010
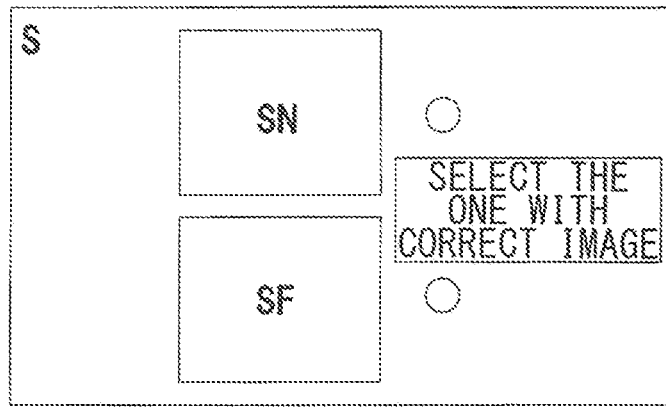

STEREOSCOPIC DISPLAY DEVICE PROJECTING PARALLAX IMAGE AND ADJUSTING AMOUNT OF PARALLAX

This application is based upon and claims the benefit of priority from the prior Japanese Patent Applications No. 2009-298580, filed Dec. 28, 2009, and No. 2010-113381, filed May 17, 2010, the entire contents of which are incorporated herein by reference.

BACKGROUND OF THE INVENTION

1. Field of the Invention

The present invention relates to a stereoscopic-image display device that allows an observer to perceive a stereoscopic image by displaying a parallax image.

2. Description of the Related Art

Since one eye of a human is about several centimeters away from the other eye, there is an offset in position between an image perceived by a right eye and an image perceived by a left image. A human brain perceives depth by using the offset in position as one of guides. Oppositely speaking, pseudo-perception of depth by a brain can be realized by providing an offset in position between respective images to be perceived by both eyes. Various methods that allow a brain to recognize a plane image as a stereoscopic image by using the binocular parallax are in practical use. The methods are divided broadly into stereoscopic technology including shutter glasses technology, polarizing glasses technology, anaglyph glasses technology, etc., and autostereoscopic technology including parallax—barrier technology, lenticular lens technology, etc.

Due to the principle of a stereoscopic-image display device that a stereoscopic image is perceived by using binocular parallax, there is a problem that, even when a same parallax image is used, a natural stereoscopic image cannot be obtained if the size of a picture plane that displays the parallax image is different. To cope with this problem, a technique of acquiring size information of a display picture plane of a stereoscopic video image, which is set in association with the stereoscopic video image, and setting the offset between a left-eye video image and a right-eye video image based on the information so as to adjust the stereoscopic effect of the video image to be displayed.

In recent years, projectors that can reproduce stereoscopic video images have been developed. Due to a feature of projecting a video image onto a projection plane such as a screen, the size of a picture plane of a projector varies according to the environment. Therefore, when the size of the picture plane is not specified as in the case of a projector, it is considered that size information of a display picture plane is not prepared.

In this background, a purpose of the present invention is to provide a stereoscopic-image displaying technique of displaying a stereoscopic image having the optimal amount of display parallax regardless of the size of a display picture plane.

One embodiment of the present invention provides a stereoscopic-image display device that projects a stereoscopic image on a projection plane and displays the stereoscopic image. The device comprises: a projection unit configured to superimpose, on a predetermined display area, a parallax image formed of a first image and a second image having predetermined parallax relative to the first image so as to project and display the parallax image; and a display size determination unit configured to determine whether or not the size of a display area in the projection plane at least an upper-limit size that is determined based on the threshold value of the amount of parallax that allows the parallax image to be perceived as a stereoscopic image.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIGS. 10A-10E are diagrams illustrating examples of images for glass checking;

FIG. 15 is a diagram illustrating images to be checked for pseudoscopic perception of a multi-view stereoscopic video image;

FIGS. 28A-28D are diagrams illustrating a display example of an image for preventing pseudoscopic perception;

DETAILED DESCRIPTION OF THE INVENTION

The invention will now be described by reference to the preferred embodiments. This does not intend to limit the scope of the present invention, but to exemplify the invention.

First Embodiment (Configuration of a Stereoscopic-Image Display System)

FIG. 1 is a diagram illustrating the configuration of a stereoscopic-image display system 10 according to a first embodiment of the present invention. The stereoscopic-image display system 10 is provided with a projection-type video-image display device 100, a camera (not shown) provided being adjacent to or incorporated in the projection-type video-image display device, a screen 21, and glasses 30.

Figure 1B:
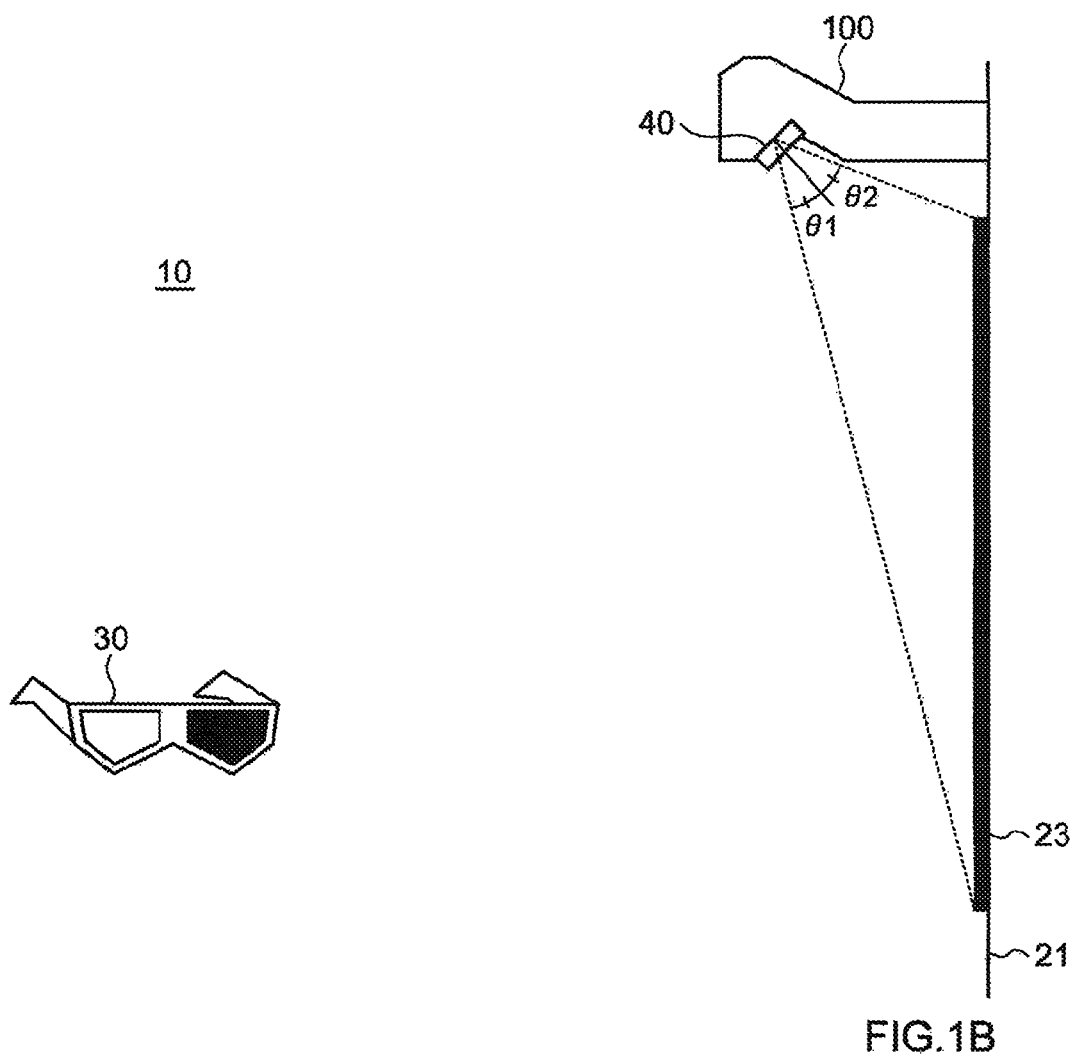
FIGS. 1A and 1B are diagrams illustrating the configuration of a stereoscopic-image display system according to a first embodiment.
Figure 1A:
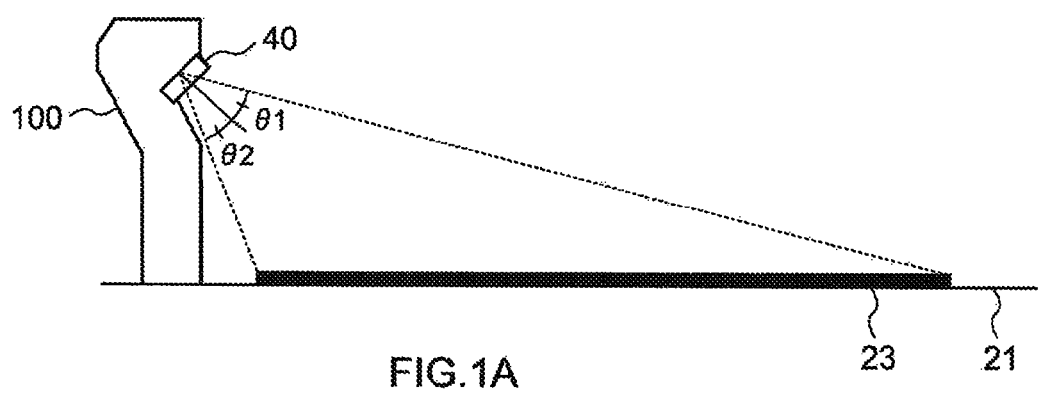

The projection-type video-image display device 100, which functions as an image display unit, is so-called an ultra-short focus projector that can be placed in an extremely short distance from a projection plane such as a screen. As shown in FIG. 1A, the projection-type video-image display device 100 of the present embodiment is placed on a floor and projects an image onto a display area 23 on a screen 21, which is also placed on the floor. Alternately, as shown in FIG. 1B, the projection-type video-image display device 100 is provided on a wall surface and projects an image onto a display area 23 on a screen 21, which is also provided on the floor. As obvious from the figures, employment of an ultra-short focus projector allows a projection distance to be short, thus allowing for effective utilization of a space. However, the projection-type video-image display device 100 may be a conventional projector that projects an image onto a screen on a wall surface located at a distance.

The projection-type video-image display device 100 displays, separately in time or space, a first image and a second image having certain parallax relative to the first image (hereinafter, the first image and the second image is collectively referred to as a "parallax image") in the display area 23.

An observer of a stereoscopic image wears glasses 30 for viewing and watches a screen. When shutter glasses technology is employed for the pair of glasses 30, the projection-type video-image display device 100 displays, in a time-divided manner, the parallax image comprising the first image and the second image. For example, the projection-type video-image display device 100 alternately displays an image for a right eye and an image for a left eye. In this case, the pair of glasses 30 operates so that, when the image for a right eye is displayed, a right eye shutter is open and a left eye shutter is closed, and so that, when the image for a left eye is displayed, the left eye shutter is open and the right eye shutter is closed. In order to synchronize the operation with the display of the parallax image, the projection-type video-image display device 100 transmits a synchronization signal, and the shutter glasses 30 receives the synchronization signal.

When polarizing glasses technology is employed for the pair of glasses 30, the projection-type video-image display device 100 displays, in a space-divided manner, the parallax image comprising the first image and the second image. For example, a retardation film is provided only in even rows at the front of display elements so that projection light from pixels on the odd rows and projection light from pixels on the even rows become different polarized light. This allows the odd rows and the even rows of an image formed on a screen to become different polarized light. Alternatively, when the parallax images comprising the first image and the second image are displayed in a time-divided manner, the projection-type video-image display device 100 alternately displays the image for a right eye and the image for a left eye and projects the image for a left eye and the image for a right eye in different polarized light, respectively, by means of a polarization switcher 40, arranged in front of a projection lens, which switches polarized light. In this case, the pair of glasses 30 is configured so that the polarized light of the image for a left eye is transmitted through the left eye lens and that the polarized light of the image for a right eye is transmitted through the right eye lens. In addition to displaying the images in a time-divided or space-divided manner, A method of overlapping the first image and the second image includes a method of projecting the image for a right eye and the image for a left eye, respectively, by two projectors in different polarized light. Observing the images through polarizing glasses allows the left eye and the right eye to see the respective images.

A camera (for example, a CCD camera) captures an image including at least the display area 23 and provides the captured image to the projection-type video-image display device 100.

(Configuration of the Projection-Type Video-Image Display Device)

Figure 2B:
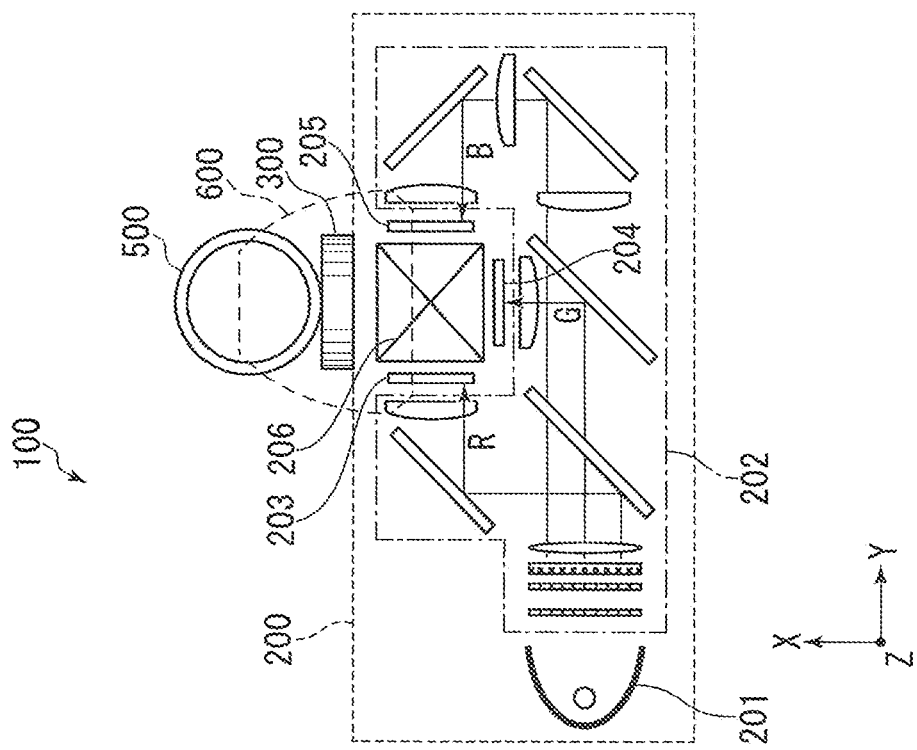
FIGS. 2A and 2B are diagrams illustrating the internal configuration of a projection-type video-image display device.
Figure 2A:
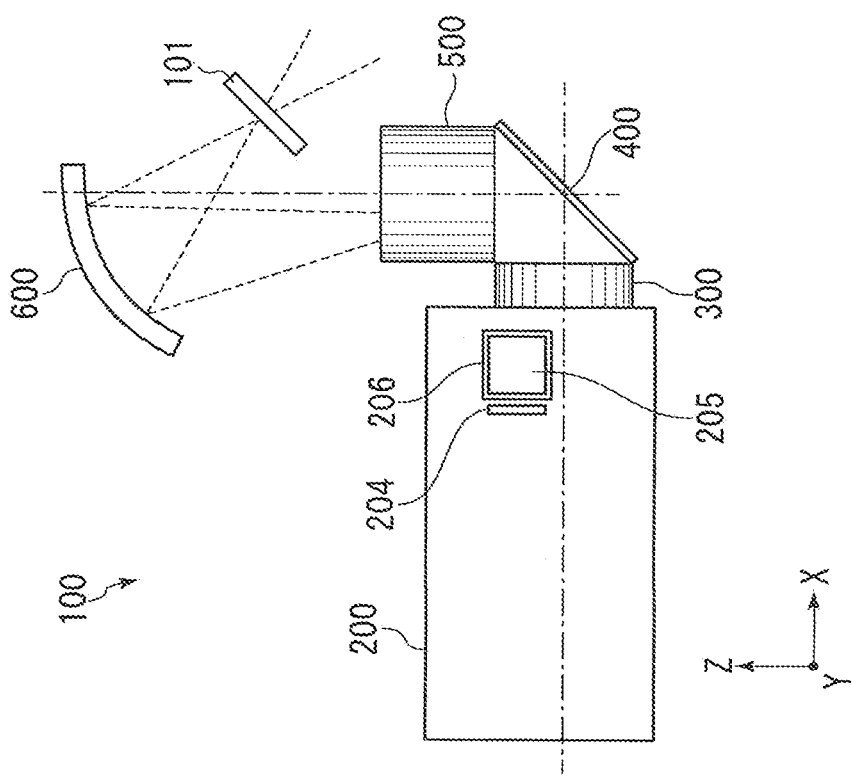

FIG. 2 is a diagram illustrating the internal configuration of the projection-type video-image display device 100. FIG. 2A is an internal perspective view, seen from the side, of the projection-type video-image display device 100. FIG. 2B is an internal perspective view, seen from above, of the projection-type video-image display device 100 and mainly shows the arrangement configuration of optical components inside an optical engine 200.

At the front of the projection-type video-image display device 100, a projection opening 101 for a video image light is formed. Since the projection-type video-image display device 100 of the present embodiment is an ultra-short focus projector, the projection opening 101 is placed such that the projection opening 101 faces obliquely downward. This allows an image to be projected also on a projection plane that is located close to the device 100.

Inside the projection-type video-image display device 100, the optical engine 200, a rear refraction optical system 300, a reflecting mirror 400, a front refraction optical system 500, and a curved mirror 600 are arranged.

The optical engine 200 generates video image light that is modulated in accordance with a video image signal. In the housing of the optical engine 200, optical components (a liquid crystal panel, a dichroic prism, etc.) are arranged in a predetermined arrangement configuration.

As shown in FIG. 2B, the optical engine 200 is provided with a light source 201, a light-guiding optical system 202, three transmissive liquid crystal panels 203, 204, and 205, and a dichroic prism 206.

White light emitted from the light source 201 is separated, by the light-guiding optical system 202, into red wavelength light (hereinafter, referred to as "R light"), green wavelength light (hereinafter, referred to as "G light"), and blue wavelength light (hereinafter, referred to as "B light"), and the light are radiated to the liquid crystal panels 203, 204, and 205. The R light, the G light, and the B light that are modulated by the liquid crystal panels 203, 204, and 205 are composed into a color image and emitted as an video image light by the dichroic prism 206.

As a light modulation device to be arranged in the optical engine 200, a reflective liquid crystal panel or a MEMS device can be used besides the transmissive liquid crystal panels 203, 204, and 205. For example, a single-panel optical system, instead of a three-panel optical system such as the one described above, in which a color wheel is used can be also used.

An emission opening for the video image light in the optical engine 200 is provided with the rear refraction optical system 300. Video image light generated in the optical engine 200 enters the rear refraction optical system 300. The rear refraction optical system 300 is provided with a plurality of lenses. As shown in FIG. 2A, the liquid crystal panels 203, 204, and 205 and the dichroic prism 206 are arranged, being shifted from an optical axis L1 of the rear refraction optical system 300 in the direction of a Z axis (toward the curved mirror 600).

The reflecting mirror 400 is arranged in front of the rear refraction optical system 300. The reflecting mirror 400 is arranged to be orthogonal to the X-Z plane and to have an angle of 45 degrees relative to the X-Y plane.

The front refraction optical system 500 is arranged above the reflecting mirror 400. The front refraction optical system 500 is provided with a plurality of lenses, and an optical axis L2 of the lenses is parallel to the Z axis and also parallel to the video-image light emission surface of the dichroic prism 206. The optical axis L2 of the front refraction optical system 500 is orthogonal to the optical axis L1 and the bottom surface of the rear refraction optical system 300, and the optical axis L2 intersects with the optical axis L1 of the rear refraction optical system 300 on the reflecting mirror 400. In other words, the front refraction optical system 500 forms one refraction optical system in cooperation with the rear refraction optical system 300, and the direction of the optical axis of a lens group is changed from a direction orthogonal to the emission surface of the dichroic prism 206 to a direction parallel to the emission surface by the reflecting mirror 400 inserted between the two refraction optical systems, that is, the rear refraction optical system 300 and the front refraction optical system 500.

The video image light that has entered the rear refraction optical system 300 then travels through the rear refraction optical system 300, the reflecting mirror 400, and the front refraction optical system 500, and finally enters the curved mirror 600 arranged above the front refraction optical system 500.

The reflection surface of the curved mirror 600 has a concave shape. As shown in FIG. 2A, the curved mirror 600 has an effective reflection area on the side of the optical engine 200 relative to the optical axis L2 of the front refraction optical system 500. The shape of the curved mirror 600 can be aspherical, free-form, or spherical.

The video image light that has entered the curved mirror 600 is reflected by the curved mirror 600 and projected, via the projection opening 101, in an enlarged manner onto a plane to be projected. The video image light converges the most near the projection opening 101, and the video image light is then enlarged at this time.

FIG. 1 is now referred back. When polarizing glasses technology is employed, the polarization switcher 40 is mounted on the projection opening of the projection-type video-image display device 100. The polarization switcher 40 is configured to receive a synchronization signal that is provided from the projection-type video-image display device 100 and then change a polarization direction in accordance with the synchronization signal. The video image passed through the polarization switcher 40 is polarized in a time-divided manner into polarized images that face the orthogonal direction with each other. Projecting the video image onto a screen that preserves the polarization and observing, with polarizing glasses, the video image light that is diffusely reflected by the screen allow a stereoscopic image to be perceived. The polarization may be linear polarization or circular polarization, i.e., right circular polarization and left circular polarization.

The polarization switcher 40 is arranged non-parallel to the screen 21. Preferably, the polarization switcher 40 is arranged so that, in the incident angle of light to the polarization switcher 40 in the vertical direction, the angle in the positive direction ($\theta 1$ in FIG. 1) and the angle in the negative direction ($\theta 2$ in FIG. 1) become the same. This minimizes the cross-sectional area of a light beam that passes through the polarization switcher 40, allowing for size reduction in the polarization switcher. For similar reasons, preferably, the polarization switcher 40 is arranged so that, in the incident angle of a light to the polarization switcher in the horizontal direction, the angle in the positive direction and the angle in the negative direction become the same. Minimizing the incident angle of a light to the polarization switcher allows the polarization performance of the switcher to be increased.

Figure 3A:
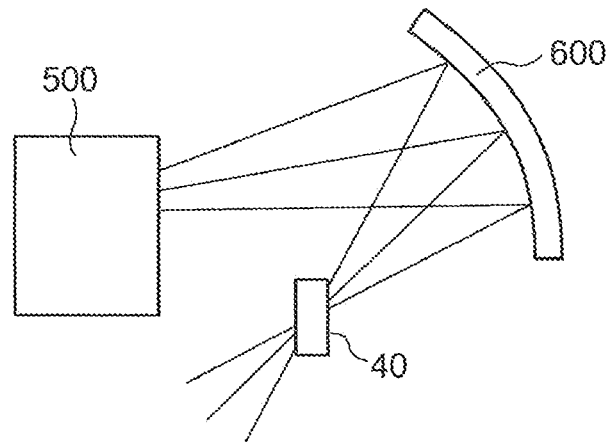
FIGS. 3A-3C are diagrams illustrating exemplary variations of a mounting position of a polarization switcher.
Figure 3B:
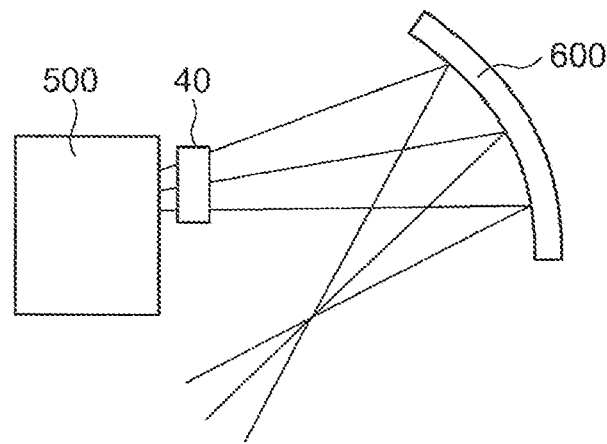
Figure 3C:
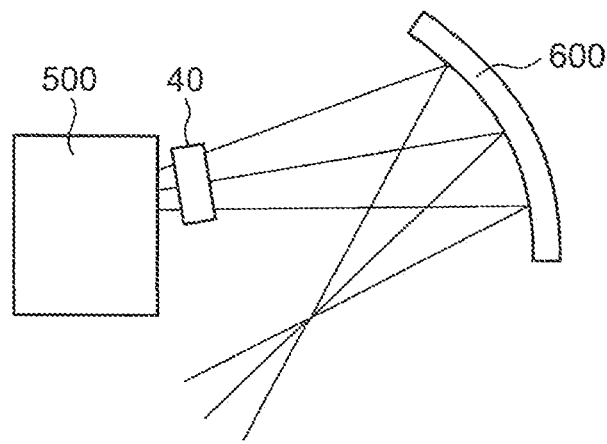

Instead of mounting the polarization switcher on the projection opening of the projection-type video-image display device 100 as shown in FIG. 1, the polarization switcher may be arranged in the device 100. FIGS. 3A-3C show exemplary variations of a mounting position of the polarization switcher 40. The polarization switcher 40 may be arranged so that a video image light enters the polarization switcher 40 after it hits the curved mirror 600 of the projection system as shown in FIG. 3A or may be arranged so that a video image light enters the polarization switcher 40 before it hits the curved mirror 600 as shown in FIG. 3B. Arranging the polarization switcher 40 such that the polarization switcher 40 is substantially perpendicular to the light flux as shown in FIG. 3C allows for size reduction in the polarization switcher.

In either case, the polarization switcher 40 is preferably configured such that the polarization switcher 40 can be easily removed from the projection-type video-image display device 100. This is because the polarization switcher is preferably removed in order to prevent the light intensity from being reduced when displaying a normal two-dimensional video image by a projection-type video-image display device or when displaying a three dimensional video image by using shutter glasses technology.

[Prevention of Excessive Parallax]

Figure 4:
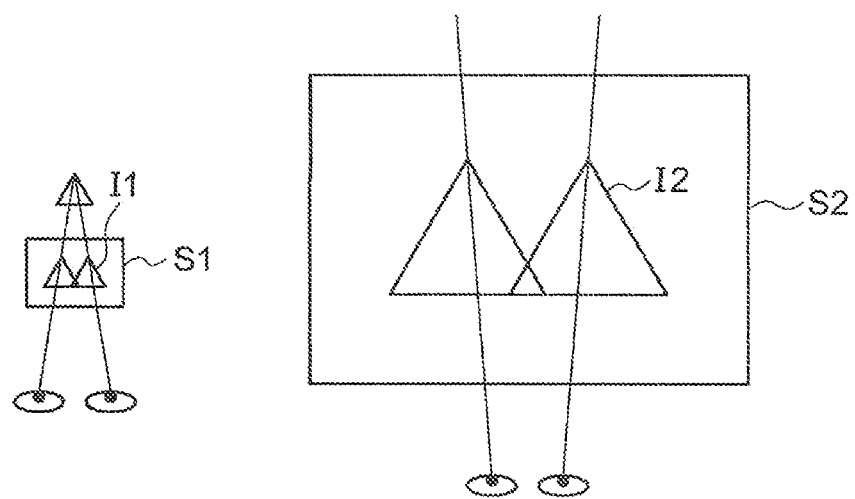
FIG. 4 is a diagram illustrating a relationship between the display size of a picture plane and the amount of left-right parallax.

FIG. 4 is a diagram illustrating a problem caused when projecting a parallax images in an enlarged manner onto a screen by using the projection-type video-image display device 100. FIG. 4 shows a parallax image I1, which is displayed on a relatively small display S1, being viewed with both eyes and a parallax image I2 of a similar shape, which is displayed on a large screen S2, being viewed with both eyes. Besides the above-mentioned shutter glasses technology and polarizing glasses technology, the problem can be also caused in any stereoscopic-image display technology in which binocular parallax is used.

In general, the amount of parallax between left and right images in a stereoscopic image increases in proportion to the size of the display picture plane. Therefore, when displayed on the large screen S2, since the lines of sight of both eyes do not cross each other, a stereoscopic view cannot be realized by using a parallax image, through which a stereoscopic image can be perceived since the lines of sight of both eyes cross each other when displayed on the relatively-small display S1. As described above, the picture-plane size and the amount of parallax to be provided in between the left and right images are closely related. In particular, in far parallax where the lines of sight do not cross each other, the stereoscopic view cannot be realized in principle when the amount of parallax between the left and right images exceeds the interocular distance of a human. There is no limitation in principle when the lines of sight cross each other in a close range. However, there exists a threshold from a physiological perspective of an observer.

The present embodiment provides a technique of adjusting the amount of display parallax among parallax images when projecting a stereoscopic image on a projection plane such as a screen.

(Function of the Projection-Type Video-Image Display Device)

Figure 5:
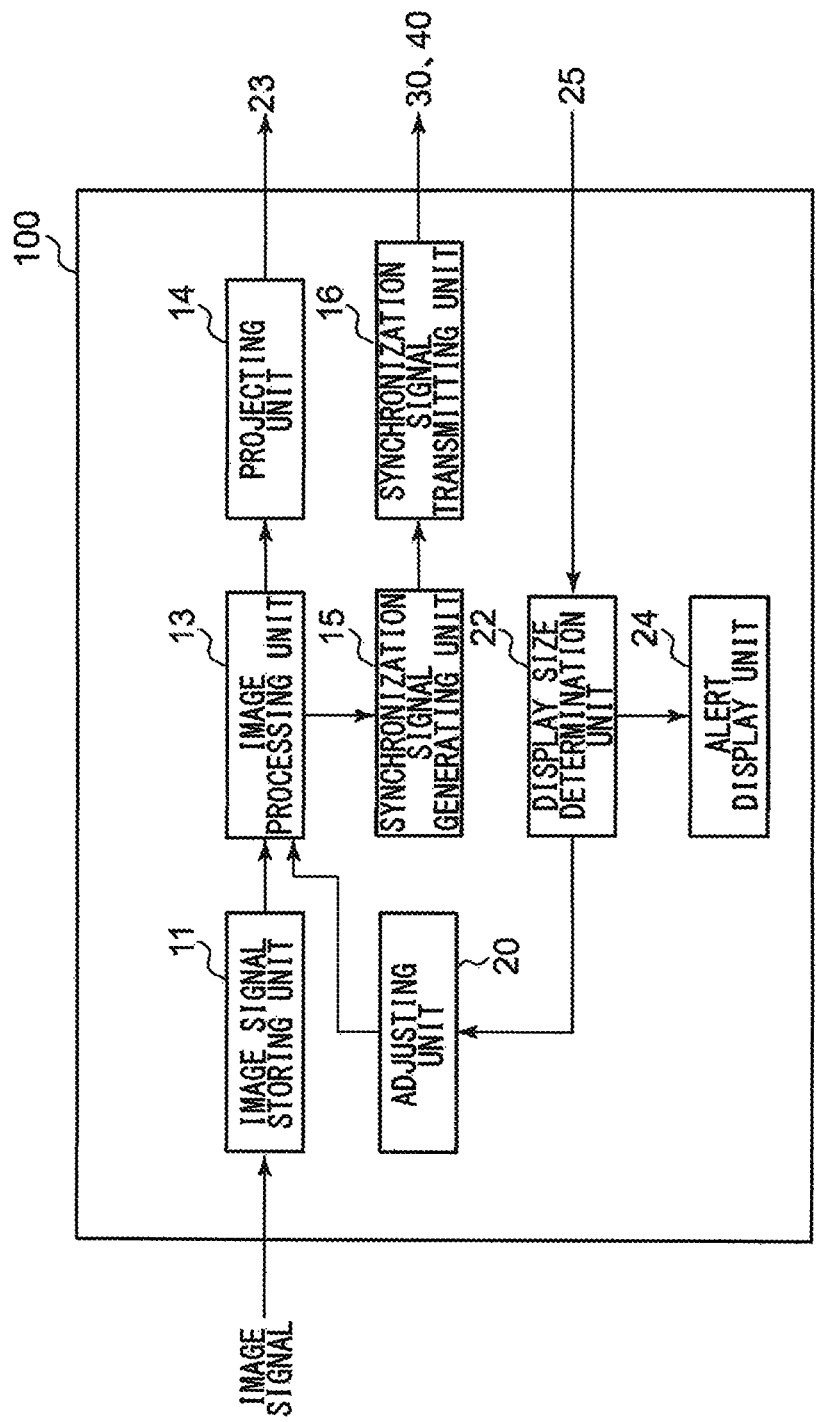
FIG. 5 is a functional block diagram of the projection-type video-image display device according to the first embodiment.

FIG. 5 is a functional block diagram of the projection-type video-image display device 100. The configuration thereof is implemented by hardware such as a processor, a memory, or other LSIs and by software such as a program or the like loaded into the memory. FIG. 5 depicts functional blocks implemented by the cooperation of hardware and software. Thus, a person skilled in the art should appreciate that there are many ways of accomplishing these functional blocks in various forms in accordance with the components of hardware only, software only, or the combination of both.

An image signal storing unit 11 stores an image signal provided from the outside. An image processing unit 13 appropriately processes the image signal stored in the image signal storing unit 11 in accordance with the instruction from an adjusting unit 20.

A projecting unit 14 projects, onto a display area 23, light corresponding to an image created by the image processing unit 13. A synchronization signal generating unit 15 generates a signal synchronized with the projection timing of each frame image projected by the projecting unit 14. A synchronization signal transmitting unit 16 transmits the synchronized signal generated by the synchronization signal generating unit 15 through wire communication or short-range wireless communication such as infrared communication or the like. The synchronization signal transmitting unit 16 transmits the synchronized signal to the glasses 30, when shutter glasses technology is employed, and to the polarization switcher 40, when polarizing glasses technology is employed.

A display size determination unit 22 computes the display size of the picture plane displayed on the screen based on an image captured by the camera 25 provided adjacent to or incorporated in the projection-type video-image display device 100. The display size determination unit 22 then determines whether or not the display size of the picture plane is equal to or larger than a predetermined upper-limit size.

The "upper-limit size" is defined to be the display size of the picture plane when the maximum amount of parallax between left and right images that form a parallax image becomes equal to the interocular distance of a human (e.g., 65 mm). In other words, the "upper-limit size" can be said to be a threshold size where a stereoscopic view cannot be realized, when the display size of the picture plane is equal to or larger than the upper-limit size, since the amount of the parallax between the left and right images exceeds the interocular distance.

More specifically, the display size determination unit 22 can obtain, for each corresponding points, the amount of the parallax between the left and right images in a unit of pixel by performing corresponding point matching on the image for a left eye and the image for a right eye that form the parallax image. The largest amount of the parallax for each corresponding point is specified to be the "maximum amount of parallax." If the maximum amount of the parallax can be found in a unit of pixel, the maximum amount of parallax in a unit of actual distance (e.g., mm) can be easily computed for the display size of the picture plane. The display size of the picture plane obtained when the maximum amount of the parallax of the actual distance becomes equal to the interocular distance is the "upper-limit size."

The maximum amount of parallax of the parallax image may not necessarily be the largest value of all the corresponding points in the image. Since the observer can pay attention to a limited number of objects, for example, the largest value of the corresponding points of a primary object in the image may be employed. Whether or not an object is the primary object can be determined by well-known image analysis technology.

The interocular distance may be fixed to be the standard distance of 65 mm, or a threshold value of the amount of the parallax, which can be used as an alternative value of the interocular distance, may be input to the display size determination unit 22 by using an input device (not shown). Alternatively, a threshold value at which a user cannot have a stereoscopic view anymore, which is obtained by gradually increasing the amount of the parallax between the left and right images while displaying the actual parallax image on the screen, may be set as the alternative value of the interocular distance.

When the display size of the picture plane is equal to or larger than the upper-limit size, an alert display unit 24 displays on the projecting unit 14 an image including a message that indicates, to the observer, that the image being displayed may contain large parallax.

When the display size of the picture plane is equal to or larger than the upper-limit size, the adjusting unit 20 instructs the image processing unit 13 to reduce the display size of the picture plane. In response, the image processing unit 13 decreases the size of the image so that the display size of the picture plane is at most the upper-limit size. In an alternative method, the display size of the picture plane may be decreased by adjusting zooming when the projection lens of the projection-type video-image display device 100 is provided with a zoom function.

Further, when the display size of the picture plane is equal to or larger than the upper-limit size, the adjusting unit 20 may instruct the image processing unit 13 to reduce the amount of the parallax between the left and right images forming the parallax image. In response, the image processing unit 13 moves the left and right images so that the amount of the parallax between the left and right images forming the parallax image becomes smaller than the previous amount, in other words, horizontally moves the images in a direction such that the left and right images become closer.

Figures 6A, 6B:
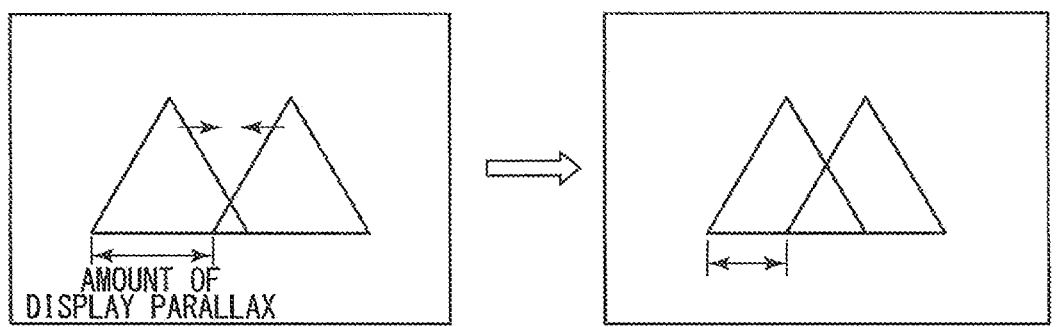
FIGS. 6A and 6B are diagrams illustrating a shift of a parallax image in a horizontal direction.

FIG. 6 illustrates the amount of the parallax being made smaller. In FIG. 6A, the amount of the parallax between the left and right images is too large as shown in the figure. Thus, the image can be modified to have a small amount of the parallax so as to be appropriate for stereoscopic viewing by moving the image for a left eye towards the right direction and moving the image for a right eye towards the left direction. Preferably, the images are moved horizontally until the amount of the parallax after the movement becomes equal to the interocular distance.

As described above, the display size determination unit 22 computes the display size of the picture plane based on the image in the display area captured by the camera. Regarding this, a detailed description is now given in reference to FIG. 7.

Figure 7:
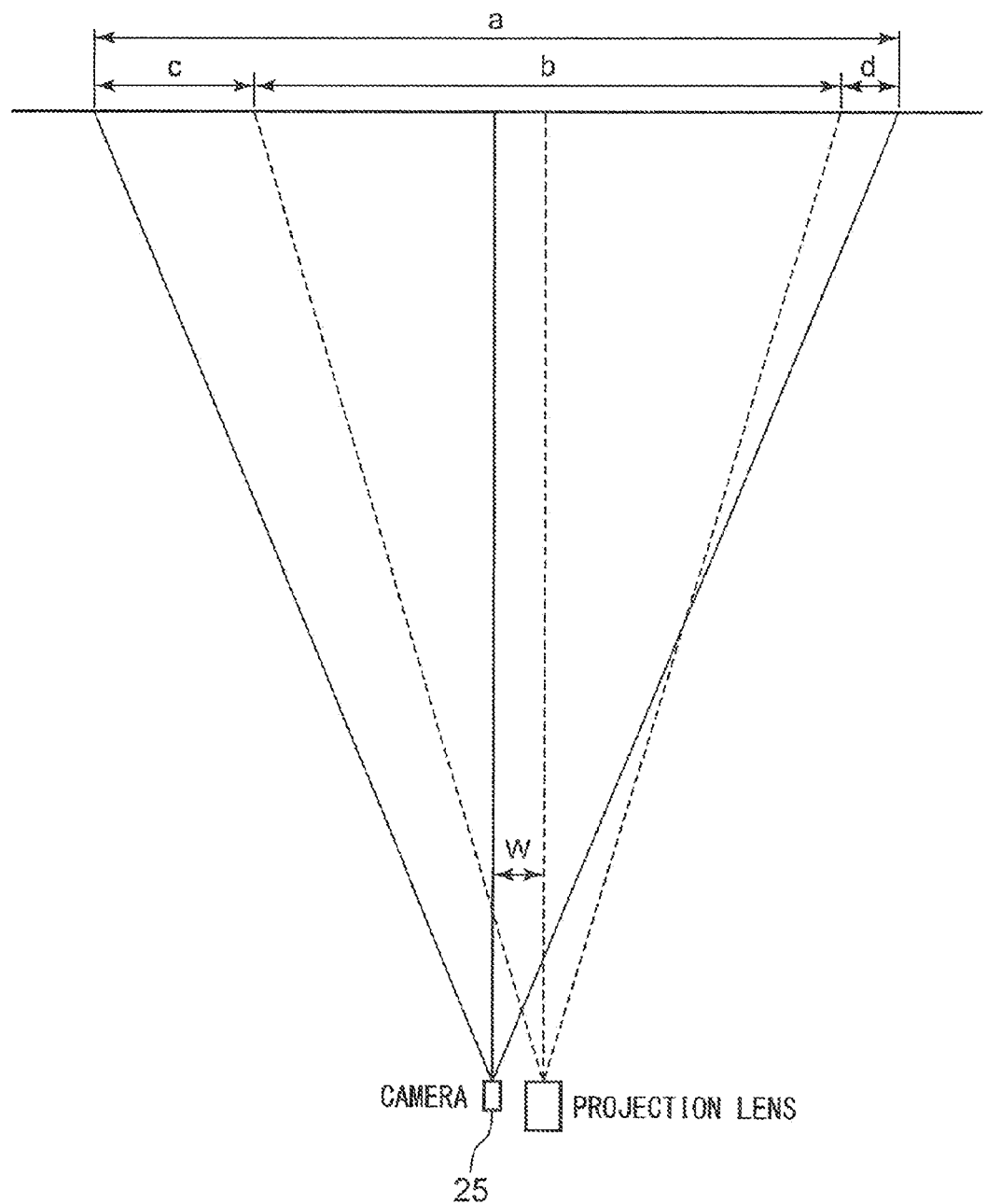
FIG. 7 is a diagram illustrating a method of computing the size of a display picture plane based on an image captured by a camera.

FIG. 7 illustrates a method of computing a display size b of the picture plane. As shown in the figure, it is assumed that the projection lens of the projection-type video-image display device 100 and the camera 25 are arranged to be apart from each other at a distance "w" in the horizontal direction. It is assumed that the image having a width "b" is projected onto the screen from the projection lens and that the camera 25 captures the image in a range of a width "a" that includes the entire width "b". When the zoom function of the camera 2 is not in use, the display size "b" of the picture plane can be obtained as shown in the following.

The display area is first detected from the image captured by the camera 25 by using a matching method, and ratios R and S are then obtained, which are the ratios of the left and right displacement amounts c and d over the width b of the picture plane size, respectively. The ratios R and S are defined as follows:

$R=c/b$ $S=d/b$

The ratios R and S can be easily obtained from the number of pixels or the like in the horizontal direction in the image. R and S can be expressed in a geometric relationship as follows:

$R=c/b=[(a-b)/2+w]/b$ $S=d/b=[(a-b)/2-w]/b$

Based on the two expressions above, the following can be found:

$R-S=2w/b$

Thus, $b=2w/(R-S)$

Since the value of w is already known, the picture plane size b can also be obtained.

As explained above, according to the present embodiment, in displaying a stereoscopic image on a projection plane by using the projection-type video-image display device, the amount of the parallax between the left and right images of the displayed parallax image can be computed so as to determine whether or not the amount of parallax is proper. The image is captured by the camera, and the maximum amount of the parallax is computed based on the captured image. Thus, the above process can be performed without any preparation of information in advance, even when the size of the display picture plane is not constant as in the case of a projector. Further, when the amount of the parallax is not proper amount, the image can be adjusted to have a proper amount of parallax by changing the picture plane size or moving the left and right images in the horizontal direction.

The case where the amount of the parallax between the left and right images is too large, in other words, the case where the display size of the picture plane is equal to or larger than the upper-limit size is described above. However, it is also possible to determine, by using a similar method, that stereoscopic viewing cannot be realized well when the amount of the parallax between the left and right images is too small relative to the display size of the picture plane (e.g., when the amount of the parallax is less than a threshold value from the physiological perspective), in other words, when the display size of the picture plane is less than a predetermined lower-limit size. In this case, the alert display unit 24 displays a massage indicating to the observer that the amount of the parallax is too small on the projecting unit 14. Alternatively, the adjusting unit 20 instructs the image processing unit 13 to enlarge the display size of the picture plane to be at least the lower-limit size. In an alternative method, the display size of the picture plane may be increased by adjusting zooming when the projection lens of the projection-type video-image display device 100 is provided with a zoom function. Further, the adjusting unit 20 may instruct the image processing unit 13 to move the left and right images apart from each other in the horizontal direction so that the amount of the parallax between the left and right images forming the parallax image becomes larger.

A description is given above regarding obtaining the maximum amount of the parallax between the left and right images forming the parallax image by corresponding point matching. Alternatively, when information on the maximum amount of parallax is added to each parallax image as meta information, the information may be used.

A description is given above regarding computing a predetermined upper-limit size at which the maximum amount of the parallax becomes equal to the interocular distance. Alternatively, when information on the upper-limit size is added to each parallax image as meta information, the information may be used.

In the above description, the display size determination unit 22 is described to compute the display size of the picture plane based on the image captured by the camera 25. However, the display size determination unit 22 may compute an angle of projection and a projection distance in reference to a zooming state and a focusing state of the camera 25 so as to obtain the display size of the picture plane based on the two.

An explanation is given so far regarding the case when the projected image from the projection-type video-image display device is a still image. When the video image to be projected is a moving image, information on a predetermined amount of parallax, the display size of a picture plane, etc., needs to be compared for each frame. However, it is very bothersome if a moving image is stopped even when almost no interference is observed by the observer in the case where stereoscopic viewing can be realized in most of the frames but cannot be realized in a part of the frames.

Thus, the configuration employed in the case where the image is a moving image is as shown in the following. For example, information, such as the maximum amount of parallax and a picture plane size of all frames, is added in advance as meta information of the moving image. A configuration may be employed such that, when there is any frame that is found to include more than the maximum amount of parallax by referring to the meta information before the production of the image, the observer is notified of the existence of such a frame.

Alternatively, the maximum amount of parallax and a picture plane size may be added to each frame. A coping process may be set where, when the information such as and when a frame is found to exceed a predetermined upper-limit size during the projection of the moving image, the frame is decreased in its size and displayed without notifying the user. Alternatively, a coping process may be set where, even when a part of the frames exceeds the predetermined upper-limit size, the large maximum amount of the parallax is allowed for a certain period of time so as to prevent a feeling of strangeness at the time of viewing the image or so as not to interfere with production effects.

The amount of the parallax between the left and right images may be changed intentionally by the user. In this case, a correction process similar to the one shown above may also be performed when the amount of the parallax is determined to exceed the maximum amount of the parallax while the above process is being set.

Second Embodiment

The second embodiment of the present invention is now described in detail.

In general, the correspondence relationship between each image and the position of a viewpoint can become unclear since a stereoscopic image includes an image for a left eye and an image for a right eye, that is, images with two viewpoints. When the image for a left eye and the image for a right eye are reproduced in an incorrect order, the observer may see a stereoscopic image that is inverted from its correct state or may not be able to see a stereoscopic image very well. This is called pseudoscopic perception. In other words, pseudoscopic perception is a state where the right eye sees the image for a left eye and the left eye sees the image for a right eye.

In the state of pseudoscopic perception, a correct stereoscopic effect cannot be obtained. For this reason, there exists a product with a projector or shutter glasses, which is provided with a reverse button for the display order of images or the operation order of the glasses, that allows the user to press the reverse button when the user notices that he/she is experiencing pseudoscopic perception. However, the user who is not used to stereoscopic viewing often does not notice that he/she is experiencing pseudoscopic perception. This is because pseudoscopic perception is not experienced in a daily life and because a human brain determines the anteroposterior relationship based on experiences with perspective. Therefore, it cannot be expected much that the user to voluntarily press the reverse button.

It is desirable that each of the images that constitute a stereoscopic video image can be distinguished to be either it is for a left eye or for a right eye in order to determine whether pseudoscopic perception will take place. However, since no such unified standards are established, each of the images are often not distinguished to be either for a left eye or for a right eye in reality.

In order to solve this problem, for example, Japanese unexamined patent publication No. 2006-72455 discloses a viewpoint position identification device, in which a first storing means that stores a group of images under test whose order of viewpoints is not clear as to whether the order start from the right position or from the left position and a second storing means that stores a group of reference images whose order of viewpoints is clear as to whether the order start from the right position or from the left position are prepared, that displays the images under test and the reference images in synchronization with each other.

However, this method requires preparation of both a group of images under test and a group of reference images for each stereoscopic video image, creating a problem that there is a heavy burden.

In the second embodiment, a technique is provided that determines the display order of multi-viewpoint images so as to prevent pseudoscopic perception without preparing a group of reference images.

Figure 8:
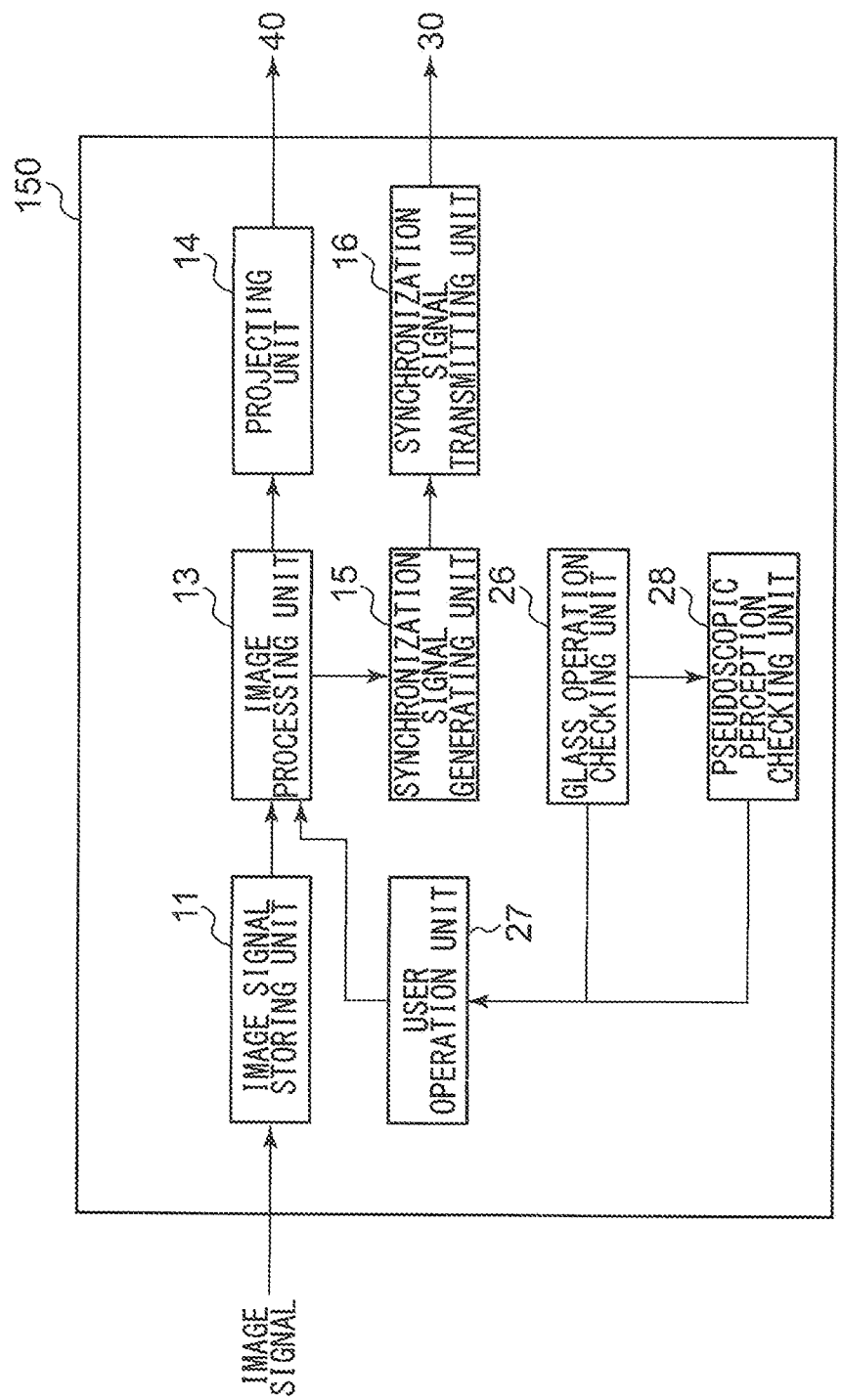
FIG. 8 is a functional block diagram of the projection-type video-image display device according to a second embodiment.

FIG. 8 is a functional block diagram of a projection-type video-image display device 150 according to the second embodiment. The configuration thereof is implemented by hardware such as a processor, a memory, or other LSIs and by software such as a program or the like loaded into the memory. FIG. 8 depicts functional blocks implemented by the cooperation of hardware and software. Thus, a person skilled in the art should appreciate that there are many ways of accomplishing these functional blocks in various forms in accordance with the components of hardware only, software only, or the combination of both.

The projection-type video-image display device 150 includes an image signal storing unit 11, an image processing unit 13, a projecting unit 14, a synchronization signal generating unit 15, and a synchronization signal transmitting unit 16. These units have similar functions as those in the corresponding blocks of the projection-type video-image display device 100 explained in the first embodiment. Thus, the detailed explanation thereof is omitted.

Upon the request from the user or at a predetermined timing, a glass operation checking unit 26 displays, on the projecting unit 14, an image for glass checking that is used to check whether the shutter glasses the observer is wearing are operating and whether the left and right shutter are normally synchronized with each other.

Upon the request from the user or at a predetermined timing, a pseudoscopic perception checking unit 28 displays, on the projecting unit 14, an image to be checked for pseudoscopic perception that is used to check whether a multi-viewpoint stereoscopic image is displayed in a correct order in the display area. When the image is a two-viewpoint stereoscopic image, the pseudoscopic perception checking unit 28 displays an image to be checked for pseudoscopic perception that is used to check whether an image for a right eye and an image for a left eye are displayed alternately in the correct order in the display area.

A user operation unit 27 receives a user's response for the image to be checked that is displayed by the glass operation checking unit 26 or the pseudoscopic perception checking unit 28. A configuration is employed such that the response from the user appears, for example, as a selection for choices that are displayed and such that the user operates a button or the like provided on the projection-type video-image display device 150 or on a remote controller (not shown) so as to select any of the choices.

An explanation is now given regarding glass operation check by the glass operation checking unit 26 and regarding pseudoscopic perception determination by the pseudoscopic perception checking unit 28.

[Glass Operation Check]

It is desirable that the operation check of a shutter glasses to be worn by the observer is conducted when a stereoscopic image is displayed by using shutter glasses technology. However, performing operation check on an individual pair of glasses requires too much work effort, particularly when there are many observers. Even if a stereoscopic image is shown as a trial and the observers is then asked whether or not the stereoscopic image can be correctly perceived, it cannot tell whether the observers can make a correct decision, particularly when they do not have much experience.

Thus, in the present embodiment, the glass operation checking unit 26 performs operation check on the shutter glasses by using a random dot image. When a button for glass operation check is pressed by the user, the glass operation checking unit 26 displays an image for glass operation check, which is configured not to be perceived without glasses but to be perceived as an three dimensional image with glasses.

Figure 9:
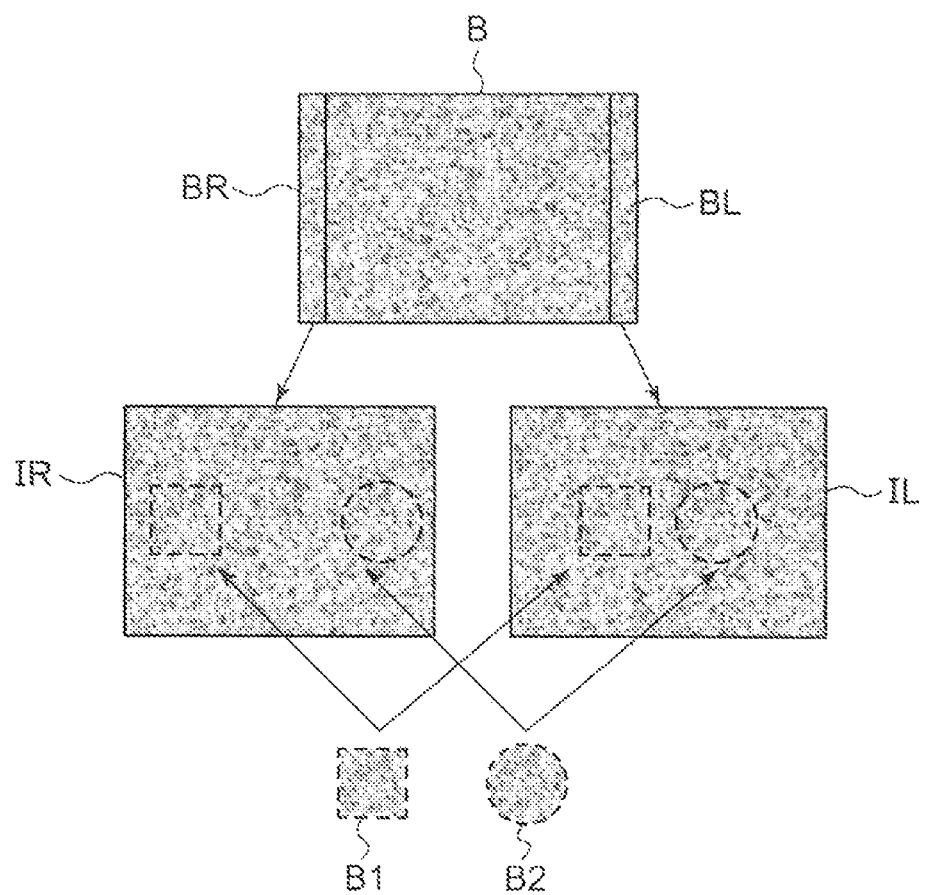
FIG. 9 is a diagram illustrating an example of an image for glass checking.

FIG. 9 illustrates a method of preparing such an image for glass operation check. Two images are first cropped out from one random dot image B at positions that are slightly different in the horizontal direction, and one of the cropped images is referred to as a background image BR for a right eye and the other cropped image is referred to as a background image BL for a left eye. An image IR for a right eye and an image IL for a left eye are formed by arranging each set of an object B1 (square shaped) and an object B2 (circle shaped), which are cropped out from another random dot image, on the background image BR for a right eye and on the background image BL for a left eye so as to provide parallax.

The reason of cropping out the background images at positions that are slightly different in the random dot image as described above is because, when the left and right background images are the same, the objects can be perceived without wearing shutter glasses since only the object parts are different between the right-eye and left-eye images. If no parallax is desired to be provided in the background images, for example, at least two sets of two random dot images are stored, and the images need to be sequentially displayed when they are used. This allows the background images to be also switched. Thus, the objects will not be perceived.

FIGS. 10A through 10C are diagrams that illustrate how the image IR for a right eye and the image IL for a left eye that are formed as described above can be perceived when observed with shutter glasses on. As shown in FIG. 10A, when a stereoscopic image cannot be perceived, it can be determined that the shutter glasses are not functioning due to some technical failure, insufficient battery power, or the like. As shown in FIG. 10B, when the object B1 is perceived to be popping out towards the observer and the object B2 is perceived to be popping in with a depth, it can be determined that the shutter glasses of the observer is functioning properly. As shown in FIG. 10C, when the object B1 is perceived to be popping in with a depth and the object B2 is perceived to be popping out towards the observer, it can be determined that left and right shutters of the shutter glasses of the observer are functioning in a left-and-right reversed manner.

As shown in FIGS. 10D and 10E, instead of a square-shaped or circle-shapes object, an image that allows the back and the front thereof to look clear may be used. Alternatively, a stepped image or a bulged image may be used as an object. Further, the image for glass operation check may be formed as a moving image that transitions from being in a flat state to a popped-out state. This allows malfunction to be more easily detected when the shutters of the shutter glasses are functioning in a left-and-right reversed manner. The object may be moved in a vertical direction, a horizontal direction, backward and forward direction, etc., and then the operation state of the glasses may be determined based on a change in the movement of the observer's head or in the orientation of the observer's face.

The random dot image may be a color image instead of a black and white image. Since no specific resolution is required for the image for glass operation check, the image for glass operation check may be stored in a small resolution and enlarged to be display when it is used.

[Pseudoscopic Perception Check]

The pseudoscopic perception checking unit 28 displays a picture plane for checking the display order of the left and right images when there is a stereoscopic video image whose viewpoint order is not known as to whether an image for a right eye or an image for a left eye is used first. In the stereoscopic video image, it is certain that the images for a right eye and the images for a left eye are alternately arranged even though the viewpoint order is not known. Thus, it is assumed in the following that, in the stereoscopic video image, images are arranged in the order of image 1, image 2, image 1, image 2, (continued).

Figure 11:
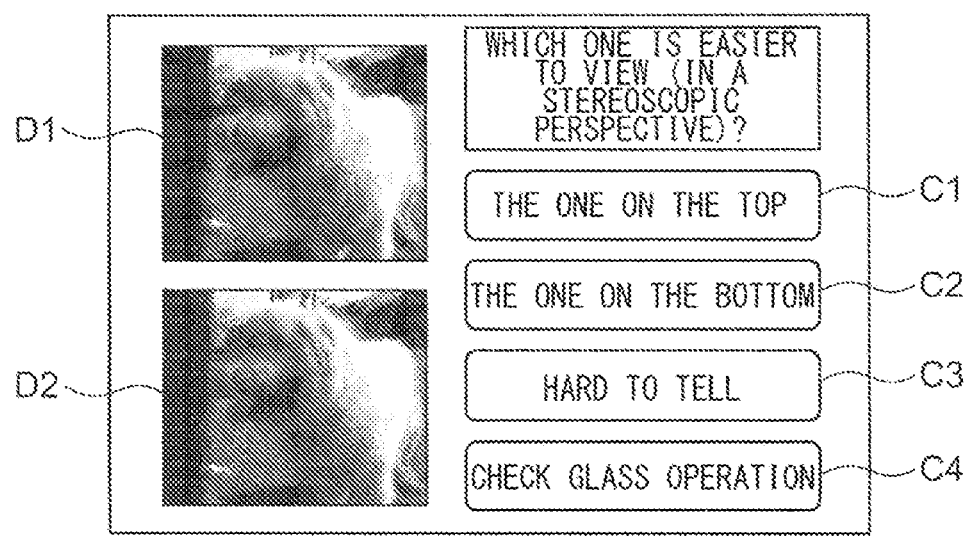
FIG. 11 is a diagram illustrating an example of images to be checked for pseudoscopic perception.

The pseudoscopic perception checking unit 28 displays a picture plane for pseudoscopic perception check as shown in FIG. 11 for a stereoscopic video image whose viewpoint order is unknown. The picture plane includes two areas D1 and D2 that are arranged vertically. In the case of a stereoscopic video image in time-division technology as shutter glasses technology, the pseudoscopic perception checking unit 28 displays the video image in the area D1 in the order of image 1, image 2, image 1, image 2, (continued) and displays the video image in the area D2 in the order of image 2, image 1, image 2, image 1, (continued). In the case of a stereoscopic video image in space-division technology as polarizing glasses technology, the pseudoscopic perception checking unit 28 displays image 1 in the order of odd numbers and image 2 in the order of even numbers in the area D1 and displays image 2 in the order of odd numbers and image 1 in the order of even numbers in the area D2.

When a device does not have enough processing performance to display two areas in a picture plane both at the same time as described above, the area D1 and the area D2 may be alternately displayed for every predetermined interval (e.g., one second).

While displaying respective two-viewpoint images whose orders are different in the areas D1 and D2, the user is asked as to an image in which area is easier to see. The user selects, by using an arbitrary input means, one from four choices C1 through C4 stating, the one on the top (D1) is easier to see, the one on the bottom (D2) is easier to see, hard to tell, or check the glass operation, respectively. When either C1 or C2 is selected, the user operation unit 27 instructs the image processing unit 13 to display the images in the order selected by the user. In accordance with this, the image processing unit 13 determines the display order of the video image. As an alternative method, the operation timing of the shutter glasses may be reversed. The operation when the choice C3 or C4 is selected is described later in FIG. 12.

A configuration may be employed such that such a picture plane for pseudoscopic perception check is displayed when the user performs a predetermined menu operation or button operation. Alternatively, a configuration may be employed such that the picture plane for pseudoscopic perception check is displayed automatically when, although the image processing unit 13 can tell that the image in the image signal storing unit 11 is a stereoscopic image, the image processing unit 13 cannot determine which image, either the image for a left eye or the image for a left eye, is arranged first. For example, the following timing can be possibly used.

1. When the display mode of the projection-type video-image display device is switched from a two-dimensional display mode to a three-dimensional display mode
2. When information indicating that the image is a stereoscopic image is obtained as meta information of the video image
3. When the image is found to be a stereoscopic video image by some sort of automatic determination method 3-1. When a border that horizontally divides the image is detected and when the left and right images are found to be a stereoscopic video image based on the correspondence relationship of the left and right images 3-2. When a border that vertically divides the image is detected and when the top and bottom images are found to be a stereoscopic video image based on the correspondence relationship between the top image and bottom image 3-3. When the images are found to be a stereoscopic video image based on the correspondence relationship between a pair of consecutive frames and alternate frames Since the correlation between alternate frames is stronger than the correlation between consecutive frames in the case where the image is a stereoscopic image, the image can be determined to be a stereoscopic image.

Figure 12:
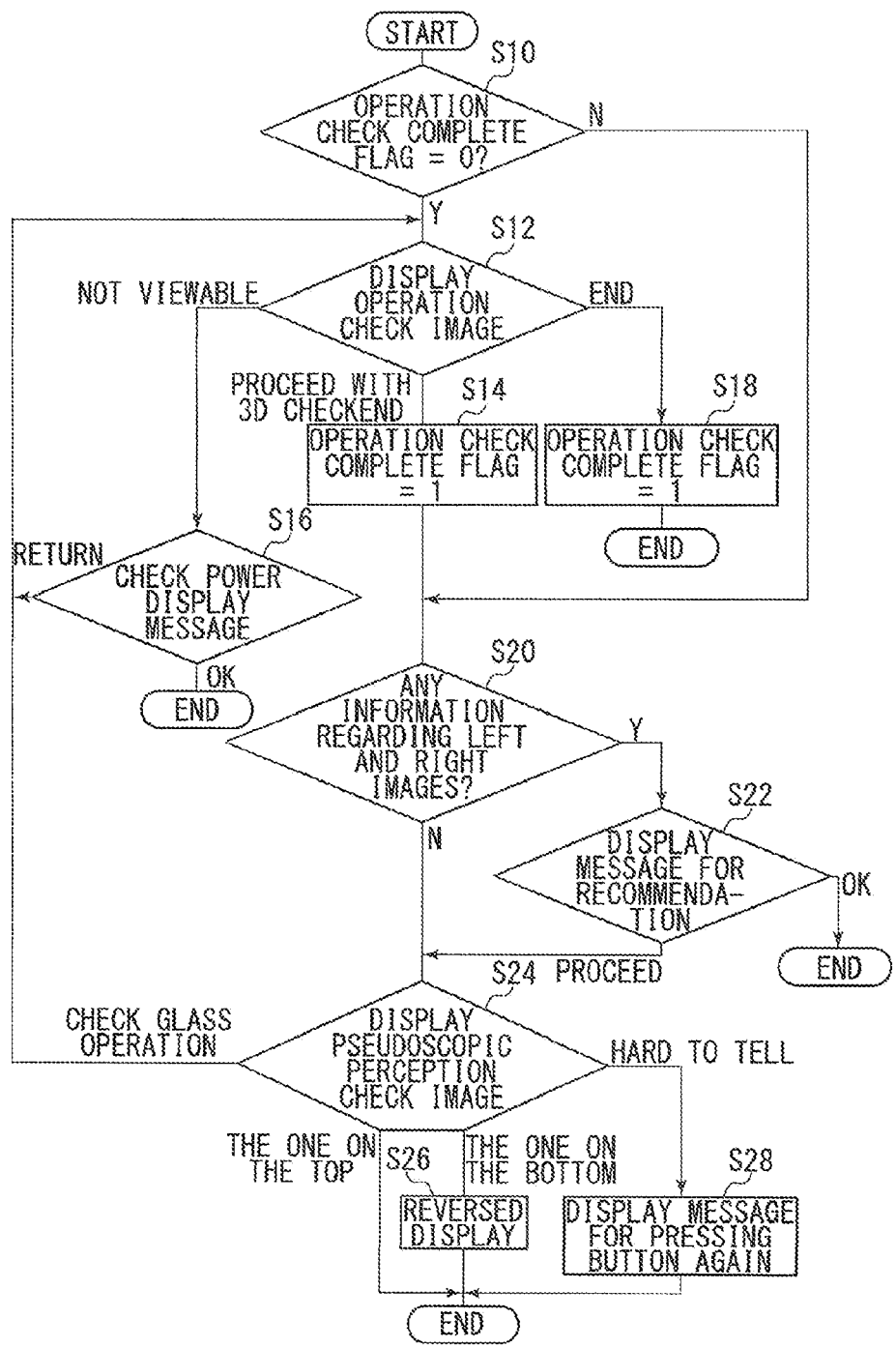
FIG. 12 is a flowchart of a process of performing a check operation of glasses and a check operation for pseudoscopic perception according to the second embodiment.
Figure 13:
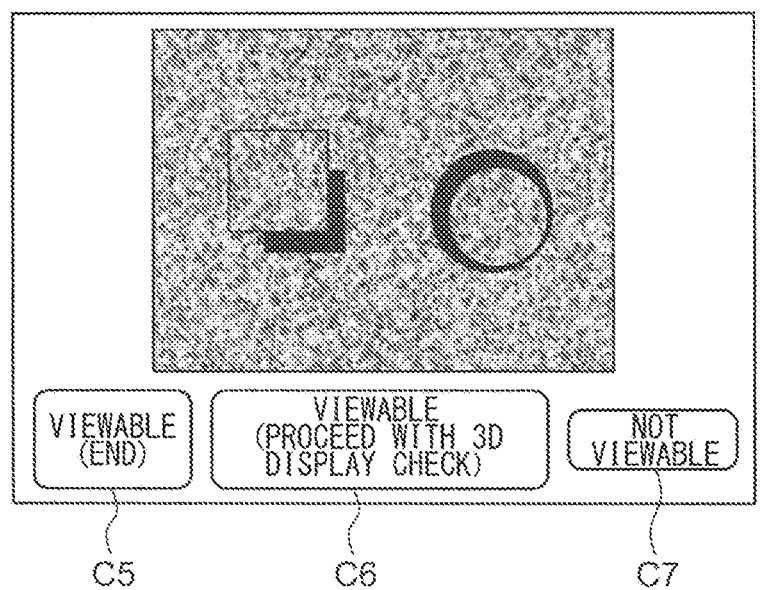
FIG. 13 is a diagram illustrating an example of an image for glass checking.

FIG. 12 is a flowchart of a process of performing a check operation of glasses and a check operation for pseudoscopic perception according to the second embodiment. The glass operation checking unit 26 first determines whether or not a glass-operation-check complete flag is zero when the user performs a predetermined menu operation or button operation or when the image processing unit 13 cannot determine which image, either the image for a left eye or the image for a left eye, is arranged first (S10). If the flag is 1 (N in S10), the step proceeds to S20. If the flag is 0 (Y in S10), the glass operation checking unit 26 displays an image for glass operation check since the operation check of the glasses is not completed (S12). FIG. 13 shows an example of the image for glass operation check. The user selects one of the three choices C5 through C7 shown in the figure by using an arbitrary input means. If the choice "Viewable (End)" is selected, the glass operation checking unit 26 sets the glass-operation-check complete flag to be 1 (S18) and ends the flow. If the choice "Not Viewable" is selected, the glass operation checking unit 26 displays a message prompting the user to check if the glasses are being powered on (S16). If the glasses are being powered on, the flow is ended. If the glasses are not being powered on, the step goes back to S12, and the checking operation is repeated.

If the choice "viewable (proceed with 3D display check)" is selected in S12, the glass operation checking unit 26 sets the glass-operation-check complete flag to be 1 (S14), and the pseudoscopic perception checking unit 28 then determines whether or not the meta information of the video image contains any information for distinguishing the left and right images (S20). If the information for distinguishing the left and right images is contained (Y in S20), a messages stating "it is recommended to display the image without checking for pseudoscopic perception" (S22). If the user follows the recommendation, the flow is ended. If the user wishes to perform pseudoscopic perception check, the step proceeds to S24. If there is no information for distinguishing the left and right images (N in S20), the pseudoscopic perception checking unit 28 displays an image to be checked for pseudoscopic perception such as the one shown in FIG. 11 (S24). As described above, the pseudoscopic perception checking unit 28 displays the images whose order is different in the area D1 and in the area D2. The pseudoscopic perception checking unit 28 then prompts the user to make an input regarding which display is easier to see stereoscopically. If the user selects the choice "the one on the top (D1)," the video image is kept being displayed. If the user selects the choice "the one on the bottom (D2)," the video image is displayed after the order thereof is reversed (S26). If the user selects the choice "hard to tell," a message is displayed (S28) stating, for example, "It can be considered that either a two-dimensional image is displayed or the image has little stereoscopic effect. Please press a button for checking once again in a different scene." If the choice "check glass operation" is selected, the step goes back to S12, and the glass operation check is repeated.

As explained above, according to the second embodiment, when there is a stereoscopic video image whose viewpoint order is unknown, a picture plane is displayed for pseudoscopic perception check that contains two areas in which the images are reproduced in a different order. Reproducing and displaying the images whose display order is different allow the user to more easily determine which order is correct.

In the present embodiment, an image to be checked specifically for pseudoscopic perception is prepared. Instead, images whose display order is reversed may be sequentially displayed in a picture plane, and the user may be asked as to which image is easier to see. However, it is often difficult to tell which one is easier to see, particularly, for the user with little experience. Concurrently displaying two images one above (or to the left or right of) the other whose orders are reversed from each other, as described above, allows even the user with little experience to more easily tell whether or not pseudoscopic perception is happening. It is also easier to tell either image is correctly displayed if the two images are concurrently displayed, even when there are multiple observers.

A configuration may be employed such that the display order of the images is reversed by merely pressing a predetermined button instead of displaying a picture plane for pseudoscopic perception check containing two picture planes, whose orders are reversed from each other, that are arranged in line. If the user is used to observing a stereoscopic image, only the reverse switching allows the user to tell which one is the correct one. A configuration may employed such that either a first mode of merely reversing the display order when a button is pressed or a second mode of displaying the above-described picture plane for pseudoscopic perception check when a button is pressed is selected. A configuration may be employed such that, when the button is pressed for multiple times (e.g., four times in ten seconds) in a predetermined period of time during the first mode, pseudoscopic perception check is determined not to be working well and a picture plane for pseudoscopic perception check is then displayed.

When the pseudoscopic perception check is performed during the reproduction of contents, the user cannot concentrate on the details of the contents. Thus, when the pseudoscopic perception check is performed during the reproduction of the contents, the contents may be reproduced after being rewound until the starting point of the pseudoscopic perception check. A message for selecting either to rewind the contents or not may displayed for the user to make a selection.

Even when the contents are directed to a moving image, any one of the frames may be captured so as to display a still image for the image to be checked for pseudoscopic perception.

In the second embodiment, an explanation is given of a case when shutter glass technology is employed. However, the pseudoscopic perception check can possibly be also necessary for a case when polarizing glasses technology is employed. In other words, it can be necessary when a synchronization signal of the polarization switcher is mismatched such that the image for a right eye are projected in polarized light for a left eye and the image for a left eye are projected in polarized light for a right eye. In this case, using an image to be checked for pseudoscopic perception such as the one shown in FIG. 11 also allows for the selection of the correct order of the images for a left eye and for a right eye.

An explanation is given above regarding the case of a two-viewpoint stereoscopic image. However, the present embodiment can be applied to the pseudoscopic perception check for an n-viewpoint stereoscopic image.

Figure 14:
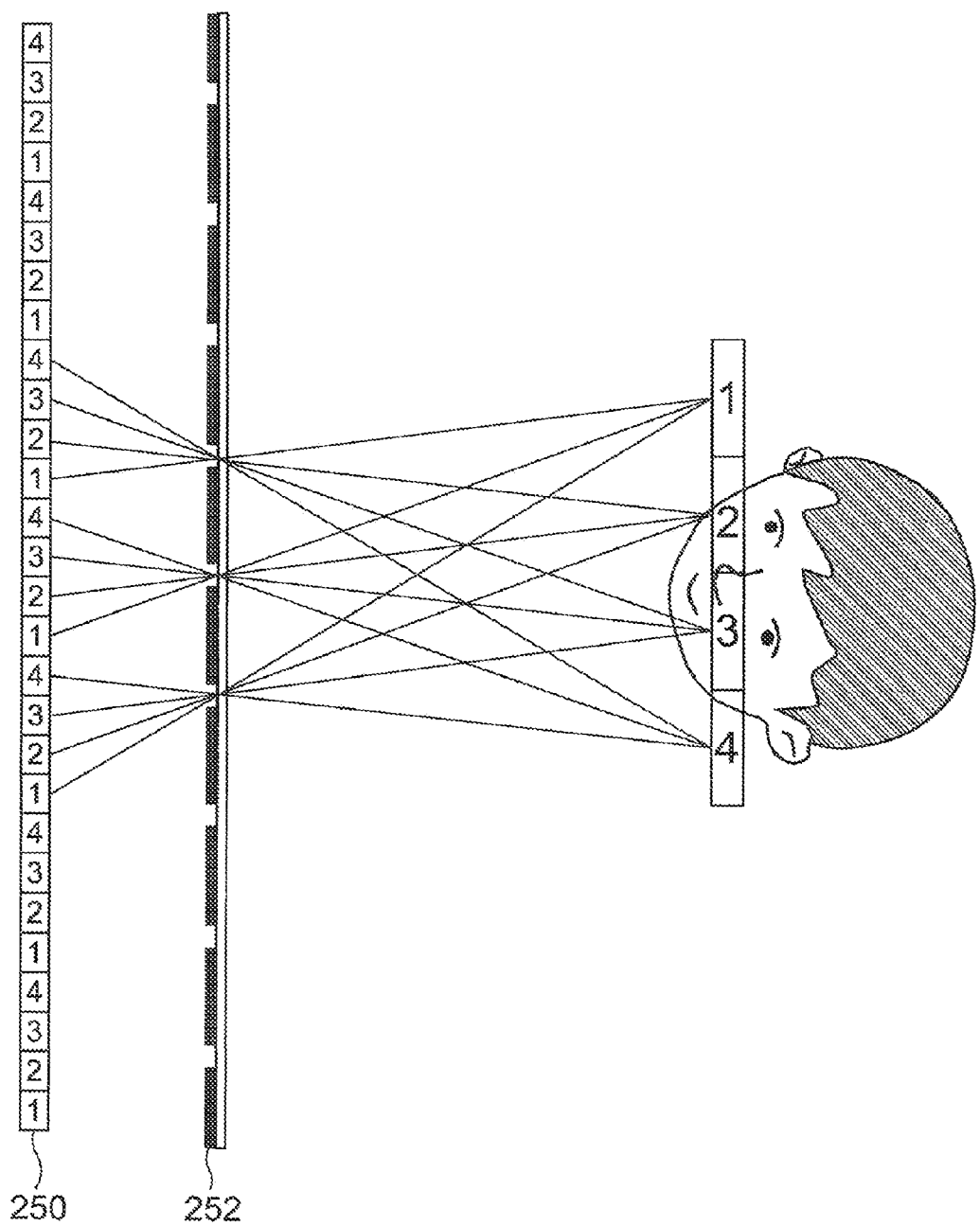
FIG. 14 is a diagram illustrating a multi-viewpoint stereoscopic video image being projected onto an autostereoscopic display.

FIG. 14 illustrates a four-viewpoint stereoscopic video image being projected by an autostereoscopic display. As shown in the figure, a parallax barrier 252, for showing different images at a plurality of viewpoints by blocking a path of light, is placed in front of a display 250. A switch liquid crystal is used for the parallax barrier 252. Four pixels are alternately displayed on the display 250 in order to provide four viewpoints. The liquid crystal of the parallax barrier 252 is controlled so that a part of the parallax barrier 252 at which lines, which connect viewpoints 1 through 4 with pixels 1 through 4, respectively, cross the parallax barrier 252 is transparent and so that the rest of the part blocks the light. This allows stereoscopic viewing to be realized at two adjacent viewpoints among the viewpoints 1 through 4. In the example shown in FIG. 14, the image for right eye is observed at the viewpoint 2, and the image for a left eye is observed at the viewpoint 3. In such a multi-viewpoint display, the order of display can be unclear as to whether the images for four viewpoints are displayed in the order of pixel 1, pixel 2, pixel 3, and pixel 4 or in the order of pixel 4, pixel 3, pixel 2, and pixel 1. Therefore, as described above, an image for checking is displayed so that the user can check for an appropriate video image.

FIG. 15 shows an example of the image for checking. The images are displayed in the order of pixel 1, pixel 2, pixel 3, and pixel 4 in a first area D1, and the images are displayed in the order of pixel 4, pixel 3, pixel 2, and pixel 1 in a second area D2. Then, the user is requested to select the one that looks properly.

The second embodiment can be realized also in the following mode.

(1) A video image display device that displays a stereoscopic video image comprising:
  a pseudoscopic perception checking unit that displays, when the stereoscopic video image is formed of a multi-viewpoint image, a picture plane for pseudoscopic perception check containing a first area in which the stereoscopic video image is reproduced and displayed in a first order and a second area in which the stereoscopic video image is reproduced and displayed in an order reversed from the first order;
  a user operation unit that allows a user to select the image in which stereoscopic viewing is easily realized from the first area and the second area; and
  a display unit that displays the stereoscopic video image in the order in which the reproduction and display occurs in the area selected by the user.
(2) The video image display device according to the mode (1), wherein the pseudoscopic perception checking unit displays the picture plane for pseudoscopic perception check when the pseudoscopic perception checking unit can determine that the video image to be reproduced is a stereoscopic video image but cannot determine the order of viewpoints.
(3) The video image display device according to the mode (1) or (2) wherein the stereoscopic video image is either a space-divided stereoscopic video image or a time-divided stereoscopic video image.
(4) The video image display device according to the modes (1) through (3) wherein the display unit reproduces, after the selection of either the first area or the second area is made by the user, the stereoscopic video image after rewinding the picture plane for pseudoscopic perception check until the point at which the picture plane for pseudoscopic perception check is first displayed.

A description is hereinbelow given of an exemplary variation of the first embodiment and the second embodiment.

[Switching the Picture Plane Direction]

The ultra-short focus projector explained in the first and second embodiments is very suitable for projection onto a floor since the ultra-short focus projector can project from a near distance. However, unlike the case of the projection onto a wall, the projection onto a floor always comes with a problem of determining which side is to be the bottom edge of a picture plane.

Figure 16A:
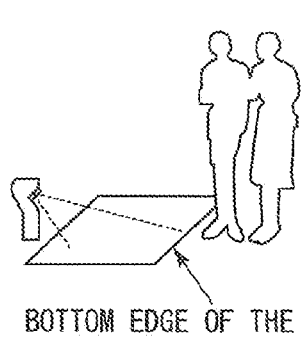
FIGS. 16A-16C are diagrams illustrating the bottom edge of a picture plane being switched to face the direction of people.
Figure 16B:
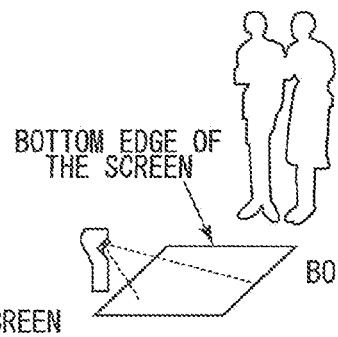
Figure 16C:
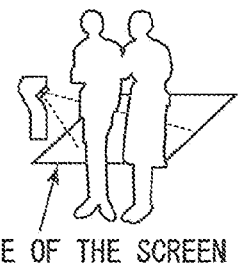

Thus, a switch button for switching the direction of the picture plane is preferably provided to either the main body of a projection-type video-image display device or a remote controller or to the both. For example, a configuration may be employed such that the side of the picture plane that is away from the projection-type video-image display device and the left and right sides of the side are switched, in order, to come to the bottom edge of the picture plane every time the switch button is pressed. As another configuration, a configuration may be employed such that a CCD camera or an infrared sensor that is connected to the projection-type video-image display device detects a person who approaches near a projection area and automatically switches the side facing the person to be the bottom edge of the picture plane, as shown in FIGS. 16A-16C.

Preferably, the angle of outputting a synchronization signal is also changed when the direction of the picture plane is switched. For example, two infrared LEDs for outputting the synchronization signal are provided to the projection-type video-image display device and mounted so that one of the infrared LEDs faces in the right direction and the other one faces in the left direction when seen from the front of the device. The device is then configured so that the synchronization signal is output from the infrared LED, which is closer to the bottom edge of the picture plane, when switching the direction of the picture plane of the projection area. This allows the receiving sensitivity to the synchronization signal of the glasses worn by the observer near the bottom edge of the picture plane to be increased.

[Directivity of Shutter Glasses]

When stereoscopic viewing is realized by using shutter glasses technology, the observer needs to keep wearing the shutter glasses while the video image is in process. There is little problem when the shutter glasses are used to keep watching a picture plane for a long time such as when watching movies. However, when stereoscopic viewing is conducted during a presentation or in a class, the observer often looks away from the screen to look at his/her own notebook, PC, written materials, etc. In such use of the glasses; even when the observer is not watching the screen, the shutter operation will continue as long as the shutter glasses keep receiving the synchronization signal from the projection-type video-image display device, interfering with the observer's view when watching a normal sight that is not a three-dimensional image. Although there will be no problem if the observer takes off the shutter glasses, it is troublesome to take off the glasses every time the observer needs to take a note, for example.

Figures 17A, 17B:
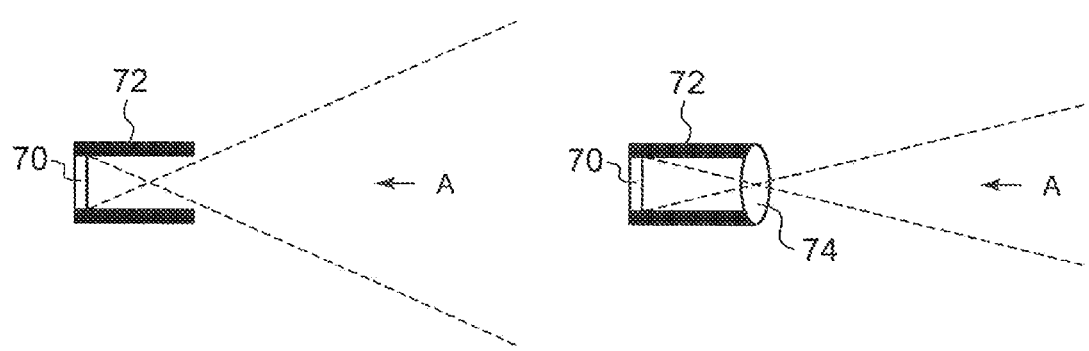
FIGS. 17A and 17B are diagrams illustrating the configuration of a light receiving unit, which is provided in a shutter glass, for a infrared-ray synchronization signal.

In this regard, the shutter glasses are preferably configured so that the shutter enters a non-operation mode when the observer looks away from the screen. FIGS. 17A and 17B illustrate the configuration of a light receiving unit, which is provided in a shutter glass, for an infrared-ray synchronization signal. As shown in the figure, a light-shielding tube 72 is provided to the shutter glasses that covers the entire circumference of an infrared receiving unit 70 and that extends in the direction of the line of sight. As shown in FIG. 17B, the direction of the directivity may further controlled by providing a lens 74 to the other end of the light-shielding tube 72. This configuration allows the synchronization signal coming in a direction A that is shown in FIGS. 17A and 17B to enter the light-shielding tube 72 and then reach the infrared receiving unit 70 when the observer wearing the shutter glasses are watching the screen, in other words, when the line of sight is substantially horizontal. On the other hand, when the observer looks away from the screen, in other words, when the line of sight is not substantially horizontal, the synchronization signal is blocked by the light-shielding tube 72 and thus cannot reach the infrared receiving unit 70.

Along with the above configuration, setting the shutter of the shutter glasses to be normally white prevents the synchronization signal from reaching the light receiving unit of the shutter glasses when the observer looks away from the screen, allowing the shutters for both eyes to be open to have a clear sight.

Figure 18:
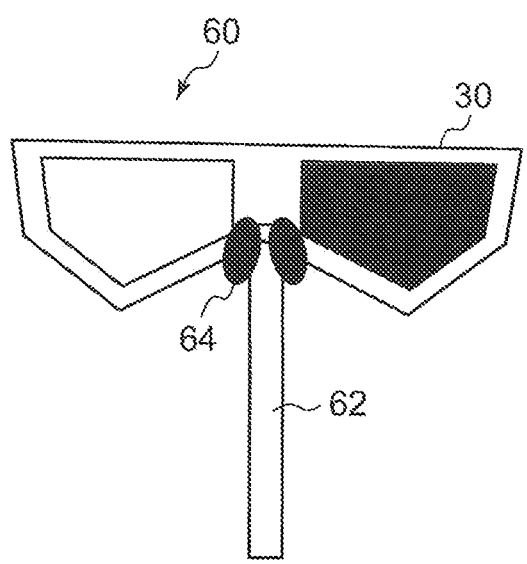
FIG. 18 is a view illustrating handheld shutter glasses.

In a situation where the observer often looks away from the screen, handheld shutter glasses 60 such as those shown in FIG. 18 may be used. Instead of the temples of the shutter glasses 30 shown in FIG. 1, a handle 62 that extends downwardly from either the center or the left or right end part of the glasses is provided to the glasses 60. Since the observer needs to bring the shutter glasses 60 in front of the eyes while holding the handle 62 only when he/she wishes to watch the screen, the troublesome of putting on and taking off the glasses can be reduced.

In the case of the handheld shutter glasses 60, there is a possibility that the observation is carried out while the front and back sides of the glasses are being reversed. When the wrong side is used, the opening and closing timing of the left and right shutters is reversed, and the stereoscopic image cannot be correctly perceived. Therefore, either a mark for preventing the glasses from being used with a wrong side on or nose pads 64 are provided to the glasses.

[Screen]

Figure 19A:
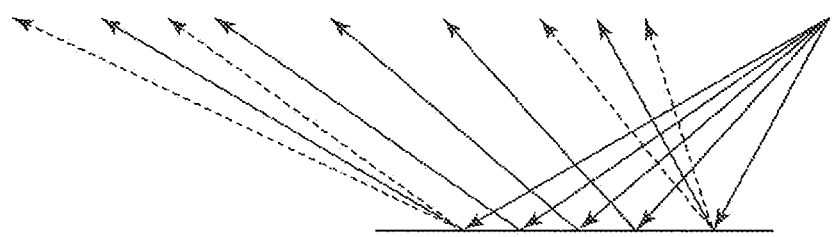
FIGS. 19A-19C are diagrams illustrating shapes and reflection directions of silver screens.

A screen onto which a stereoscopic image is projected needs to preserve the polarization of projected light. A silver screen obtained by applying silver paint to a regular screen is common for this. Due to its low diffusibility, the polarizing screen has a property of reflecting most light beams in an output angle that is equal to an incident angle as shown in FIG. 19A. When such a polarizing screen and an ultra-short focus projector are used in combination, there arises a problem that the uniformity of the brightness on the screen is reduced because there is, in principle, a huge variation in the incident angles when an ultra-short focus projector is used.

Figure 19B:
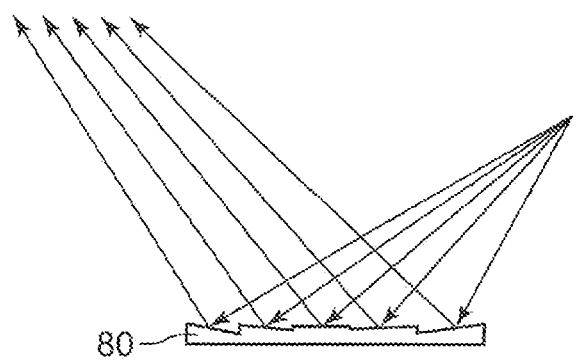
Figure 19C:
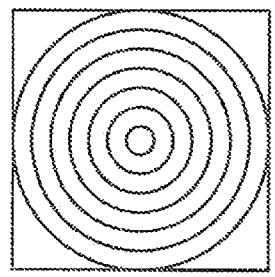

In this regard, preferably, a silver screen formed to guide light in predetermined directions is prepared as shown in FIG. 19B, when a polarizing screen is used with an ultra-short focus projector. A silver screen 80 is formed so as to be a part of a Fresnel lens having a concentric shape shown in FIG. 19C.

Figure 20A:
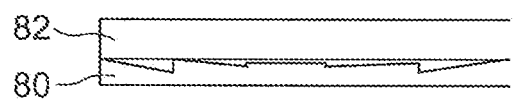
FIGS. 20A-20C are diagrams illustrating examples of a protecting plate that protects a concave-convex surface of a silver screen.
Figure 20B:
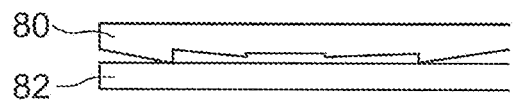
Figure 20C:
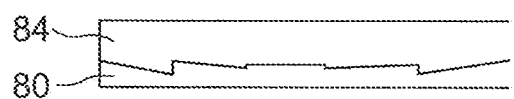

FIGS. 20A-20C illustrate examples of a protecting plate 82 that protects a concave-convex surface of the silver screen 80. When the silver screen 80 is arranged on a floor, the protecting plate 82 is preferably provided so that the observer can be on top of the screen. The protecting plate 82 may be used as the upper surface as shown in the FIG. 20A, or the protecting plate 82 may be used as the lower surface as shown in the FIG. 20B. Alternatively, a protecting plate 84 may be formed in a shape that fits the concave-convex surface of the silver screen 80 as shown in FIG. 20C.

In the second embodiment, an explanation is given regarding a situation when two images, the first image and the second image, are displayed in glasses technology. However, in shutter glasses technology, a situation is possible where an observation is made by selecting two images after displaying at least three images. For example, there is a situation where a first image, a second image, and a third image are displayed in order and whether to observe the first image and the second image or to observe the second image and the third image is selected based on the position of the observer. The present invention can be also applied to such a situation.

Third Embodiment

The third embodiment of the present invention is now described in detail.

In a method where two kinds of images having predetermined parallax are displayed in a time-divided or space-divided manner, a position of observation at which a stereoscopic image can be perceived may be limited. In other words, when a stereoscopic image is observed from the direction in which there is no binocular parallax produced, the stereoscopic image cannot be perceived as a stereoscopic image. For example, when a stereoscopic image is displayed on the floor and when two kinds of images are displayed such that parallax is produced being viewed from the direction of a given side of a display surface, the stereoscopic image can be perceived as a stereoscopic image from the direction but cannot be perceived as a stereoscopic image from a direction of a different side.

In the third embodiment, a technique that allows a user to observe a stereoscopic image from a position of observation at which the stereoscopic image can be easily perceived.

Overview of the Third Embodiment

An image display system according to the third embodiment is provided with a display device that allows a stereoscopic image to be displayed on a substantially horizontal plane and with glasses that allow a user to perceive the stereoscopic image. A first area where the stereoscopic image is observed from a direction that is substantially perpendicular to the parallax direction of the stereoscopic image and a second area where the stereoscopic image is observed from a direction that is substantially parallel to the parallax direction of the stereoscopic image are arranged in a surrounding area of a display area of the display device. The image display system comprises a distinguishing unit for distinguishing between the first area from the second area, and the glasses are controlled so that the stereoscopic image cannot be perceived in the second area.

In addition to the floor plane explained in the present embodiment, the substantially horizontal plane includes a ceiling plane. Possible examples of a ceiling plane include a ceiling plane that has an inclination of about 30 degrees relative to the horizontal plane and a ceiling plane that has a curved surface such as the one in a planetarium. Considering the problem of the present embodiment, the substantially horizontal plane also includes these planes. Similarly, it is assumed that a direction that is substantially perpendicular to the parallax direction and a direction that is substantially parallel to the parallax direction include at least a direction which is within the range of plus or minus 30 degrees from the line perpendicular to the parallax direction and a direction which is within the range of plus or minus 30 degrees from the line parallel to the parallax direction, respectively.

In the above image display system, the distinguishing means is preferably provided to the glasses. When the glasses are found to be located in the second area, the glasses control the condition of the right glass and/or the left glass so that the user cannot perceive the stereoscopic image. Further, the glasses are provided with an alarm means for alarming the user that the area has been changed when the glasses are found to have transitioned from the first area to the second area and/or when the glasses are found to have transitioned from the second area to the first area.

(Configuration of a Stereoscopic-Image Display System)

Figure 21:
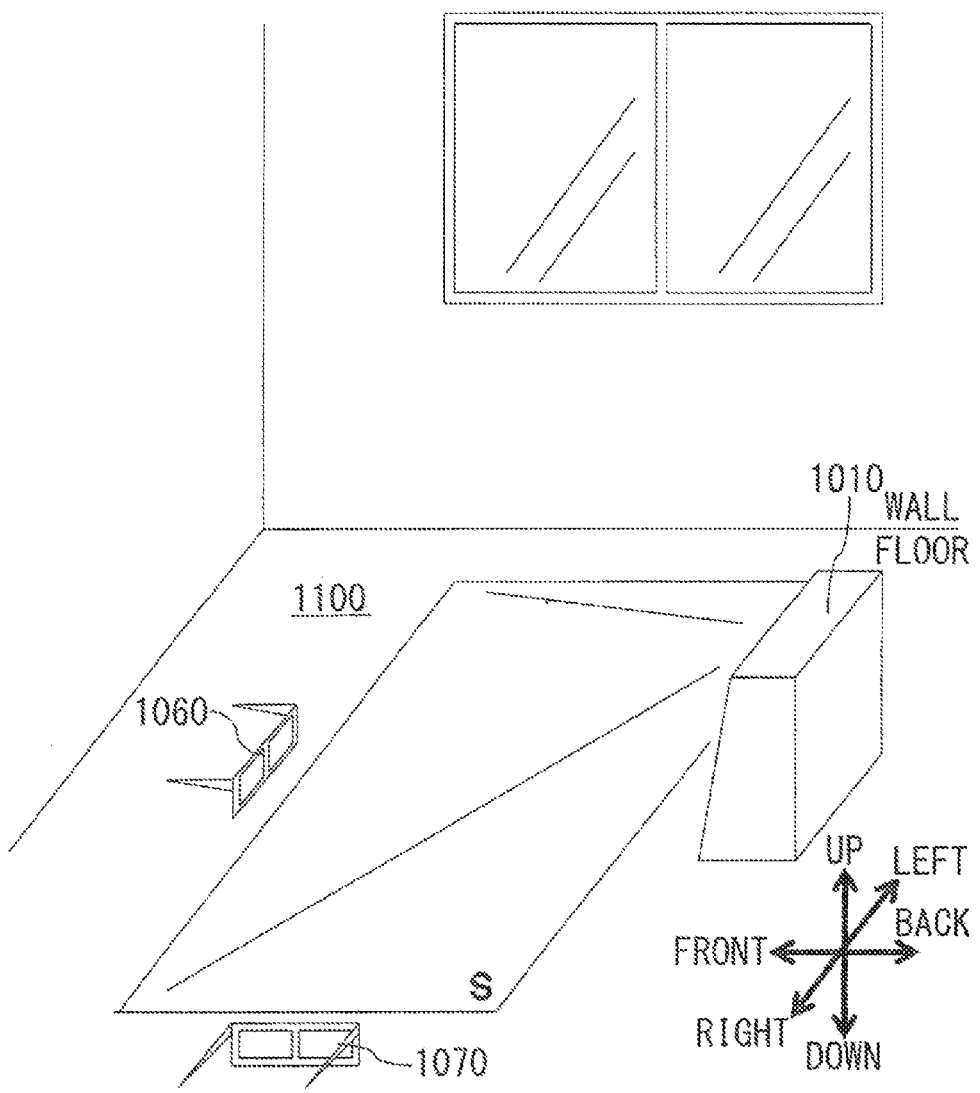
FIG. 21 is a diagram illustrating the configuration of an image display system according to a third embodiment.

FIG. 21 is a diagram illustrating the configuration of an image display system 1100 according to the third embodiment of the present invention. The image display system 1100 is provided with a projection-type video-image display device 1010, first glasses 1060, and second glasses 1070.

The projection-type video-image display device 1010 are configured to project video-image light, which is emitted upwards in FIG. 21 from a group of projection lenses (not shown), onto a floor plane by reflecting the video-image light obliquely downwards by using a concave mirror (not shown). A screen may be provided on the floor plane that is used as a projection area S of the image display system 1100, or the video-image light may be directly projected onto the floor plane. In the case of the image display system 1100, the user wearing the first glasses 1060 or the second glasses 1070 observes a stereoscopic image from around the projection area S.

(Configuration of the Projection-Type Image Display Device)

Figure 22:
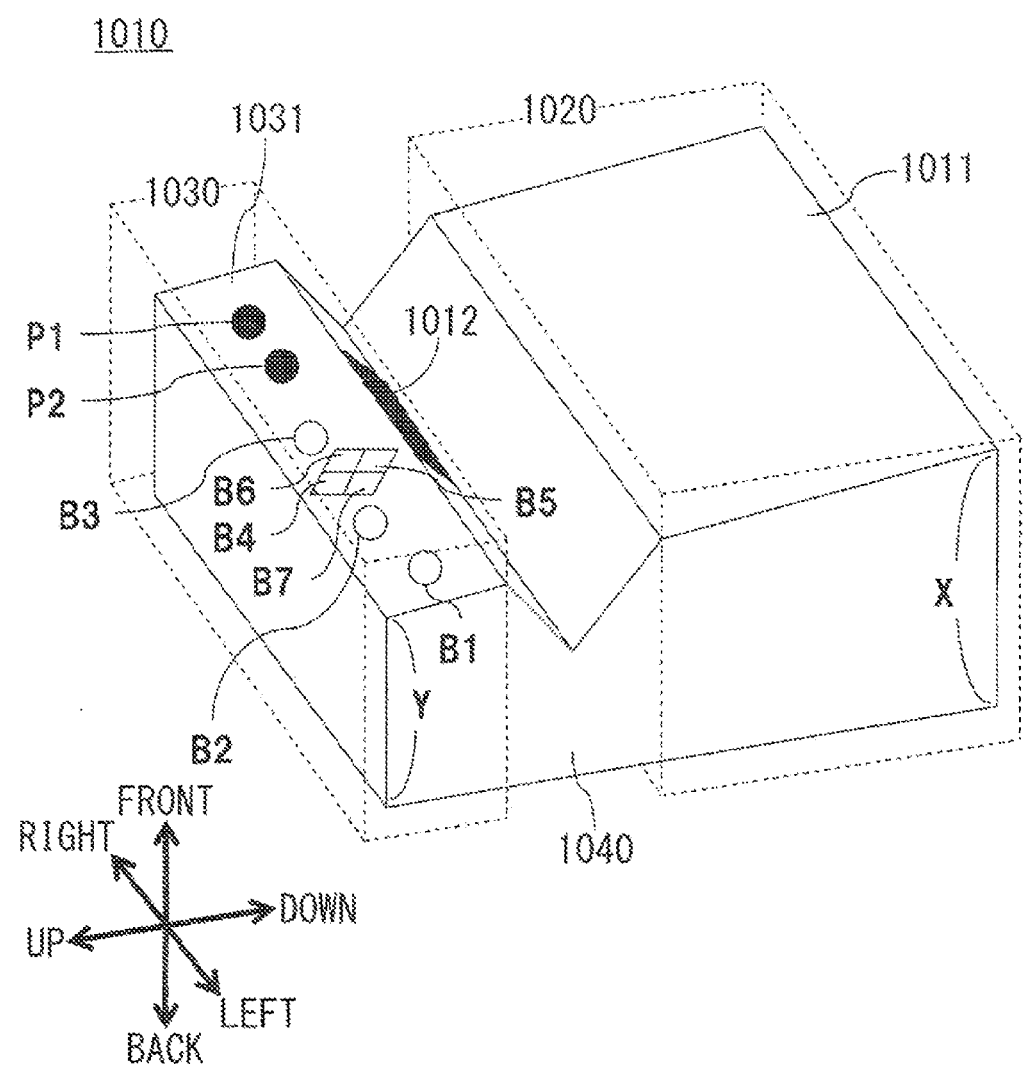
FIG. 22 is a diagram illustrating the exterior structure of a projection-type video-image display device according to the third embodiment.

FIG. 22 is a diagram illustrating the exterior structure of the projection-type video-image display device 1010 according to the third embodiment. The projection-type video-image display device 1010 has a video-image-light generation unit inside thereof. The video-image-light generation unit comprises a UHP lamp, a color wheel, a rod integrator, a plurality of relay lenses, a DMD (Digital Micromirror Device), and the like. The DMD according to the present embodiment can generate 120 video images per second.

The video image reflected by the DMD enters a projection optical unit. The projection optical unit comprises a group of projection lenses, a concave mirror, and the like. More specifically, the video-image light is emitted after being enlarged by the group of projection lenses and the video image is formed once between the group of projection lenses and the concave mirror. The video-image light is reflected by the concave mirror and emitted to the outside of a housing 1011 of the projection-type video-image display device 1010. A projection window 1012 formed of a light-permeable member may be provided at the position where the video-image light is emitted to the outside of the projection-type video-image display device 1010. Further, when the projection window 1012 is provided near where the vide-image light is collected on the concave mirror, the size of the projection window can be smaller.

The projection-type video-image display device 1010 has a body portion 1020 in which the video-image-light generation unit is provided, a head portion 1030 in which the concave mirror is provided, and a neck portion 1040, to which the above projection window or the like is provided, that is a narrow part located between the body portion 1020 and the head portion 1030. Designing a thickness dimension Y of the head portion 1030 to be smaller than a thickness dimension X of the body portion 1202 allows the projection-type video-image display device 1010 to be stably placed, even when the video-image light is to be projected onto a floor plane.

An operating unit is provided to the head portion 1030 on a surface 1031 in the direction of the emission of the video-image light. More specifically, a power button B1, a menu button B2, a select button B3, an upper-direction instruction button B4, a lower-direction instruction button B5, a right-direction instruction button B6, and a left-direction instruction button B7 are provided. In addition, a light-receiving unit P1 that receives light of a signal from a remote controller and a light-emitting unit P2 that emits a light signal (synchronization signal) to the shutter glasses 1060 and 1070 are also provided on the surface 1031.

[Explanation of Stereoscopic Viewing Area]

Figure 23:
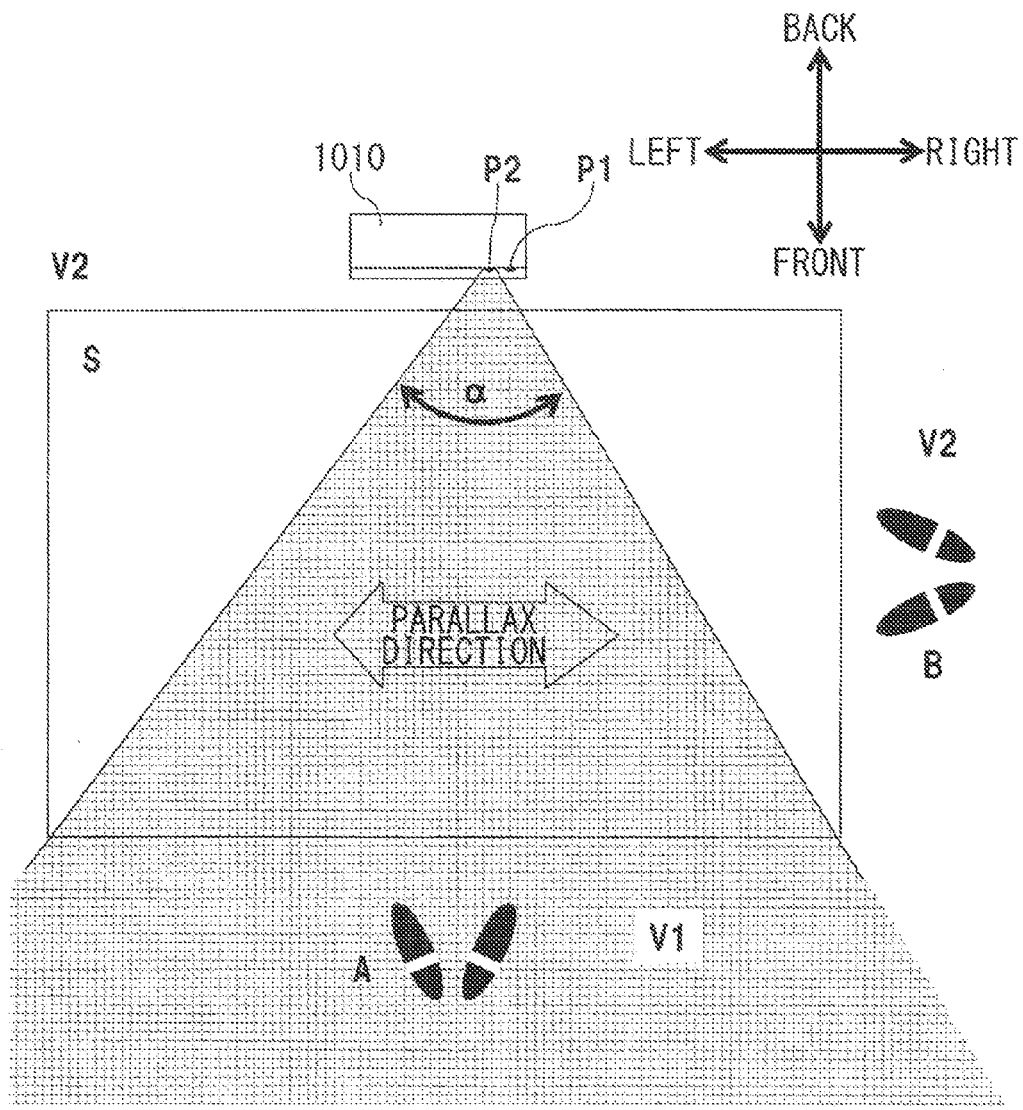
FIG. 23 is a diagram illustrating a stereoscopic viewing area of an image display system.

FIG. 23 is a diagram explaining a stereoscopic viewing area of the image display system 1100 according to the third embodiment and corresponds to the top view of FIG. 21. When an image provided with parallax in the direction of a double-headed arrow is projected onto a projection area S, the user observing a stereoscopic image from a position A while wearing the first shutter glasses 1060 can perceive the stereoscopic image. On the other hand, the user observing the stereoscopic image from a position B while wearing the second shutter glasses 1070 cannot perceive the stereoscopic image since the direction of the parallax of the image is orthogonal to the direction of the parallax between both eyes.

A synchronization signal is emitted from the light-emitting unit P2 with use of an infrared ray to a range having a predetermined angle $\alpha$. The predetermined angle $\alpha$ may be set to be, for example, plus and minus 25 degrees with respect to the rectilinear direction or may be set so that the video-image light meets an apex, which is far from the body of the projection-type video-image display device 1010, of the projection area S onto which the video-image light is projected.

Figure 24:
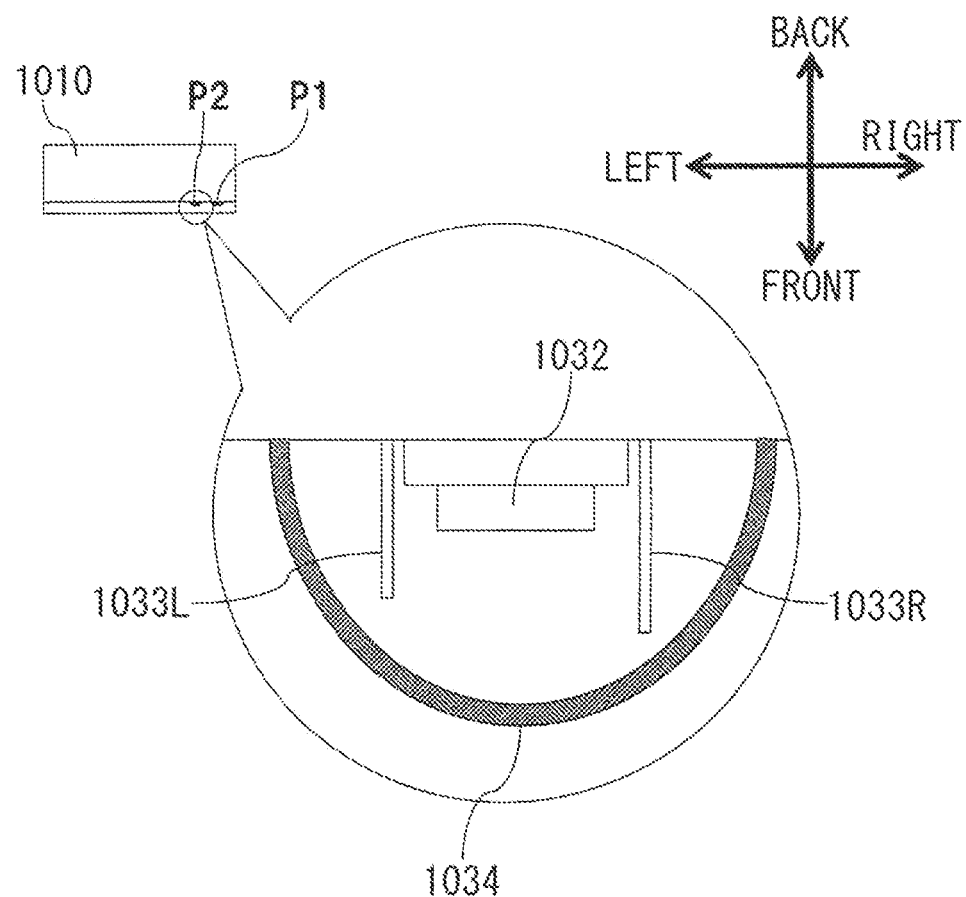
FIG. 24 is a diagram illustrating the configuration of a light emitting unit that sets the stereoscopic viewing area of the image display system.

More specifically, as shown in FIG. 24, the light-emitting unit P2 has an LED (Light Emitting Diode) 1032 that emits a infrared ray, a light-shielding plate 1033 R and a light-shielding plate 1033 L that are provided on both sides (the right side and the left side in FIG. 23, respectively) of the LED 1032 and that adjust the predetermined angle $\alpha$, and a protection cover 1034 that protects the LED 1032 and the light-shielding plates 1033.

This allows the projection-type video-image display device 1010 and the shutter glasses 1060 and 1070 to be correctly synchronized with respect to the user observing the stereoscopic image from the direction where the parallax between both eyes and the parallax of the image are substantially the same. More specifically, referring back to FIG. 23, in an area V1, including the position A, that allows for observation of the stereoscopic image from the direction where the parallax between both eyes and the parallax of the image are substantially the same, the projection-type video-image display device 1010 and the shutter glasses 1060 and 1070 can be correctly synchronized. On the other hand, in an area V2, including the position B, where the stereoscopic image is observed from the direction where the parallax between both eyes is substantially orthogonal to the parallax of the image, the projection-type video-image display device 1010 and the shutter glasses 1060 and 1070 cannot be synchronized.

[Explanation of Shutter Glasses]

Figure 25:
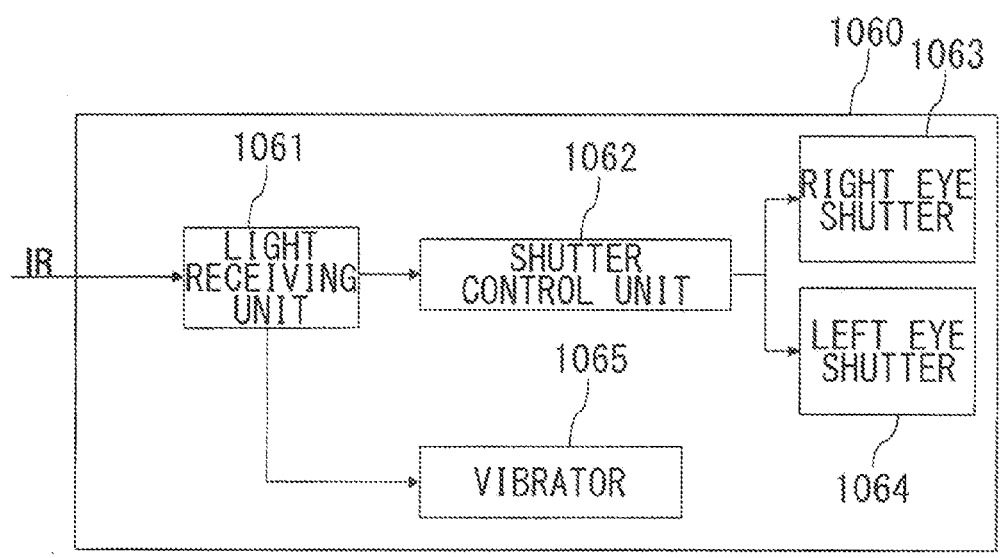
FIG. 25 is a block diagram illustrating a method of controlling shutter glasses.

FIG. 25 is a block diagram illustrating a control method of the shutter glasses 1060 of the image display system 1100 according to the third embodiment. The shutter glasses 1060 have a light-receiving unit 1061 that receives the light of the synchronization signal from the light-emitting unit P2 of the projection-type video-image display device 1010. The light-receiving unit 1061 is preferably provided at the central position of the shutter glasses 1060 near the glabella of the user.

Receiving the synchronization signal from the projection-type video-image display device 1010, the light-receiving unit 1061 transmits the synchronization signal to a shutter control unit 1062. According to the synchronization signal, the shutter control unit 1062 sequentially controls the opening and closing of a right-eye-side shutter 1063 and a left-eye-side shutter 1064 (see FIG. 26A).

Figure 26:
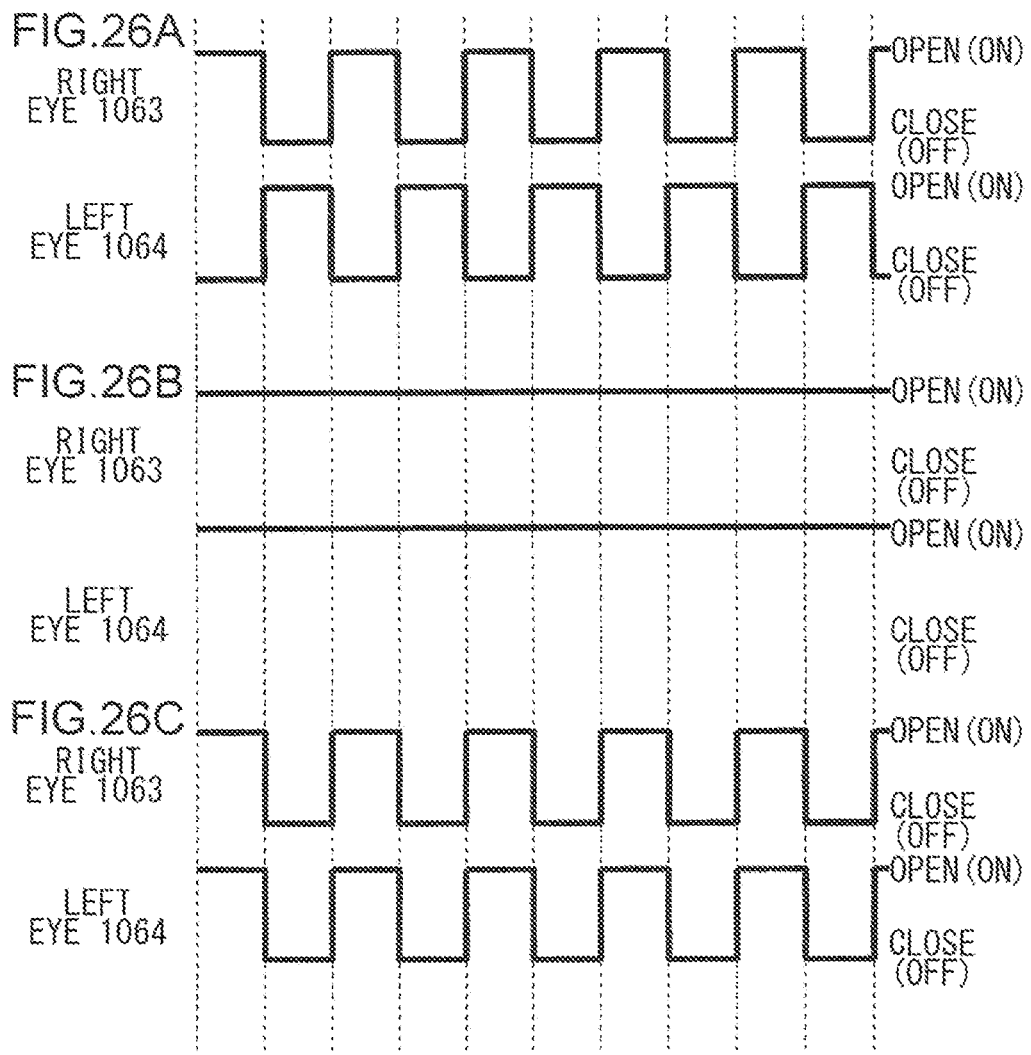
FIGS. 26A-26C are timing charts illustrating the method of controlling shutter glasses.

On the other hand, the light-receiving unit 1061 cannot transmit the synchronization signal to the shutter control unit 1062 when the synchronization signal cannot be received from the projection-type video-image display device 1010. In this case, as shown in. FIG. 26B, the shutter control unit 1062 leaves the right-eye-side shutter 1063 and the left-eye-side shutter 1064 fully opened all the time. With this, for example, an obvious double image is observed from the position B, allowing the user to easily realize that the stereoscopic image cannot be observed. Note that shutters may be fully opened when a voltage is applied or when a voltage is not applied.

The light-receiving unit 1061 transmits to a vibrator 1065 a control signal indicating that the reception status of the synchronization signal is changed when the light-receiving unit 1061 moves from an area where the synchronization signal can be received to an area where the synchronization signal cannot be received and when the light-receiving unit 1061 moves from an area where the synchronization signal cannot be received to an area where the synchronization signal can be received. Upon the receipt of the control signal, the vibrator 1065 generates vibrations for about a second. This allows the user wearing the shutter glasses 1060 to physically feel that the reception status of the synchronization signal is changed.

In other words, this allows the user to more easily realize that the user has moved from the area where the synchronization signal can be received to the area where the synchronization signal cannot be received or that the user has returned back to the area where the synchronization signal can be received from the area where the synchronization signal cannot be received.

Figure 27:
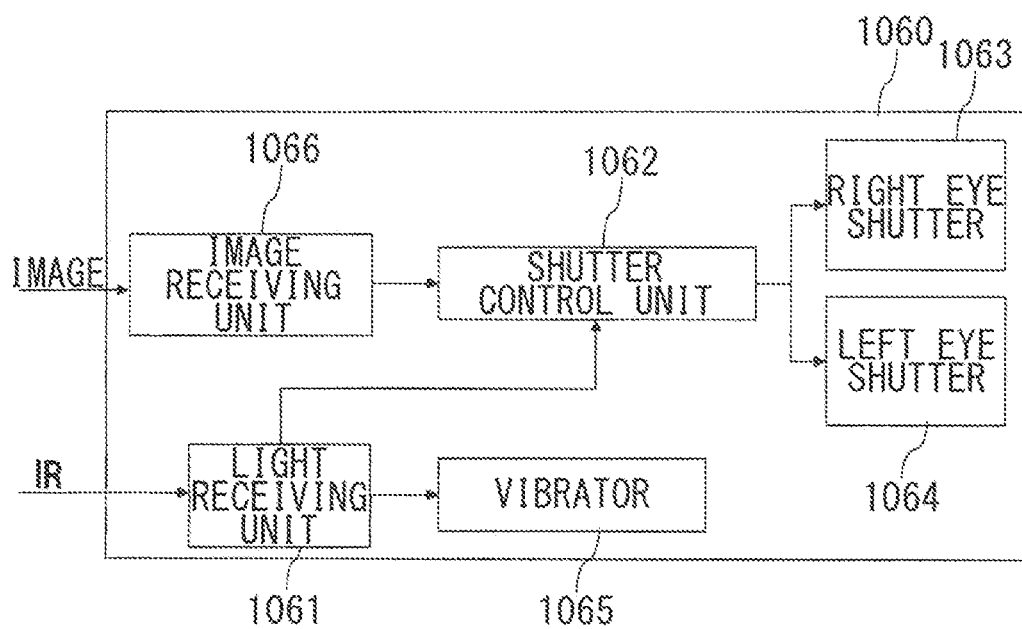
FIG. 27 is a block diagram illustrating another method of controlling shutter glasses.

When the synchronization signal is being inserted as an image between the frames of the stereoscopic image and is being received as an image synchronization signal, the shutter control unit 1062 can constantly receive the synchronization signal via an image receiving unit 1066. Therefore, as shown in FIG. 27, the light receiving unit 1061 needs to transmit a signal regarding the position of the user to the shutter control unit 1062. As shown in FIG. 26C, the shutter control unit 1062 opens or closes the right-eye-side shutter 1063 and the left-eye-side shutter 1064 at the same timing. With this, for example, obvious two-dimensional image is observed from the position B, allowing the user to easily realize that the stereoscopic image cannot be observed. When the image synchronization signal, which is inserted between the frames of the stereoscopic image, or the like is not being received, the right-eye-side shutter 1063 and the left-eye-side shutter 1064 may be opened or closed at the same timing by using a frequency that is substantially same as the display frequency of the image. In this case, since the right-eye-side shutter 1063 and the left-eye-side shutter 1064 are not synchronization with the images, the image observed by the user is gradually switched from a plane image (image for a right eye), a double image, a plane image (image for a left eye), and a double image in the said order.

[Display Example of Image to be Checked for Pseudoscopic Perception]

In general, the correspondence relationship between each image and the position of a viewpoint can become unclear since a stereoscopic image includes an image for a left eye and an image for a right eye, that is, images with two viewpoints. When the image for a left eye and the image for a right eye are reproduced in an incorrect order, the observer may see a stereoscopic image that is inverted from its correct state or may not be able to see a stereoscopic image very well. This is called pseudoscopic perception. In other words, pseudoscopic perception is a state where the right eye sees the image for a left eye and the left eye sees the image for a right eye.

In the state of pseudoscopic perception, a correct stereoscopic effect cannot be obtained. For this reason, there exists a product with a projector or shutter glasses, which is provided with a reverse button for the display order of images or the operation order of the glasses, that allows the user to press the reverse button when the user notices that he/she is experiencing pseudoscopic perception. However, the user who is not used to stereoscopic viewing often does not notice that he/she is experiencing pseudoscopic perception. This is because pseudoscopic perception is not experienced in a daily life and because a human brain determines the anteroposterior relationship based on experiences with perspective. Therefore, it cannot be expected much that the user to voluntarily press the reverse button.

It is desirable that each of the images that constitute a stereoscopic image can be distinguished to be either it is for a left eye or for a right eye in order to determine whether pseudoscopic perception will take place. However, since no such unified standards are established, each of the images are often not distinguished to be either for a left eye or for a right eye in reality.

An explanation is given of a technique of determining the display order of multi-viewpoint images so as to prevent pseudoscopic perception without preparing a group of reference images.

Upon the request from the user or at a predetermined timing such as when the display of a stereoscopic image is started, the projection-type video-image display device 1010 displays an image to be checked for pseudoscopic perception. More specifically, the projection-type video-image display device 1010 displays the image to be checked for pseudoscopic perception that is used to check whether or not an image for a right eye and an image for a left eye are displayed alternately in a correct order in a display area.

A configuration is employed such that, for example, based on choices that are displayed, the user operates a button or the like provided on the projection-type video-image display device 1010 or on a remote controller (not shown) so as to select any of the choices.

FIG. 28 is a diagram illustrating a specific example of the image to be checked for pseudoscopic perception that is formed as described above. In the specific example, a circle figure is arranged behind a rectangle figure such that a part of the circle figure is hidden by the rectangle figure. More specifically, FIG. 28A illustrates an image IR for a right eye, and FIG. 28B illustrates an image IL for a left eye. FIG. 28C illustrates an Image IC obtained by combining the image IR for a right eye and the image IL for a left eye while reducing the pixel value of each of the images into half.

As shown in FIG. 28D, when checking whether or not pseudoscopic viewing is occurring, for example, the images are displayed in a section SN, in the projection area S, that is close to the projection-type video-image display device 1010 in an order of IR, IC, IR, IC, (continued), in a frequency of 120 Hz. At the same time, the images are displayed in a section SF, in the projection area S, that is far from the projection-type video-image display device 1010 in an order of IC, IR, IC, IR, (continued), in a frequency of 120 Hz. The pixel value of the image IR may be reduced to be half (to be the same pixel value as that of the image component for a right eye of the image IC) at this time.

If the shutter glasses 1060 and 1070 are driven to be in an open state (ON state) in the order of a shutter for a right eye, a shutter for a left eye, a shutter for a right eye, a shutter for a left eye, (continued) in the frequency of 120 Hz, an image for checking displayed in the projection area SN can be observed without a sense of discomfort at this time. On the other hand, in an image for checking displayed in the projection area SF, it looks that a circle figure is in front of a rectangle figure and further that a part of the circle figure is missing because of the rectangle figure, allowing even the user, who is not used to stereoscopic viewing, to realize that the stereoscopic viewing is obviously occurring.

A configuration may be employed such that such a picture plane for pseudoscopic perception check is displayed when the user performs a predetermined menu operation or button operation. For example, the following timing can be possibly used.

1. When the display mode of the projection-type video-image display device is switched from a two-dimensional display mode to a three-dimensional display mode
2. When information indicating that the image is a stereoscopic image is obtained as meta information of the image
3. When the image is found to be a stereoscopic image by some sort of automatic determination method
   3-1. When a border that horizontally divides the image is detected and when the left and right images are found to be a stereoscopic image based on the correspondence relationship of the left and right images
   3-2. When a border that vertically divides the image is detected and when the top and bottom images are found to be a stereoscopic image based on the correspondence relationship between the top image and bottom image
   3-3. When the images are found to be a stereoscopic image based on the correspondence relationship between a pair of consecutive frames and alternate frames Since the correlation between alternate frames is stronger than the correlation between consecutive frames in the case where the image is a stereoscopic image, the image can be determined to be a stereoscopic image.

As explained above, when there is a stereoscopic image whose viewpoint order is unknown, a picture plane is displayed for pseudoscopic perception check that contains two areas in which the images are reproduced in a different order. Reproducing and displaying the images whose display order is different allow the user to more easily determine which order is correct.

[Display Example of OSD]

Figure 29A:
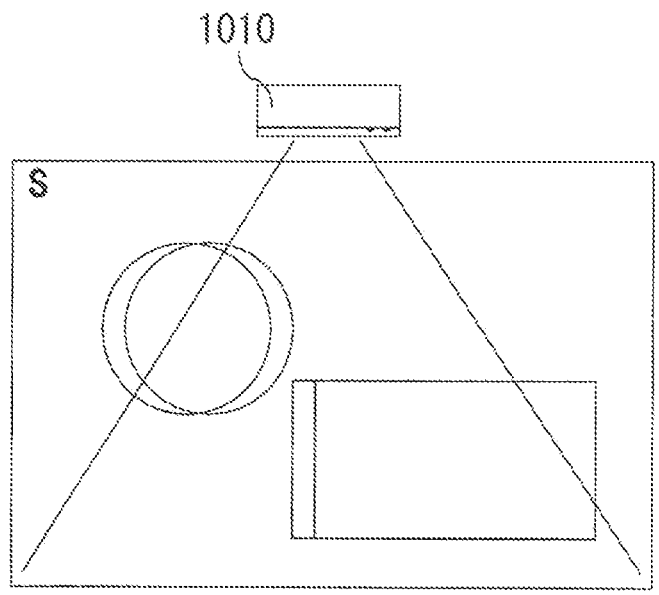
FIGS. 29A and 29B are diagrams illustrating a display example of an OSD.

FIG. 29 is a display example for a case where a menu screen for setting an input source, changing an image size such as keystone correction, or the like is displayed, along with an image from the input source, in the projection area. When a menu button B2 is pressed when a stereoscopic image such as the one is shown in FIG. 29A, a two-dimensional image (plane image) is displayed in the stereoscopic image, and it is difficult for the user to see the image.

Figure 29B:
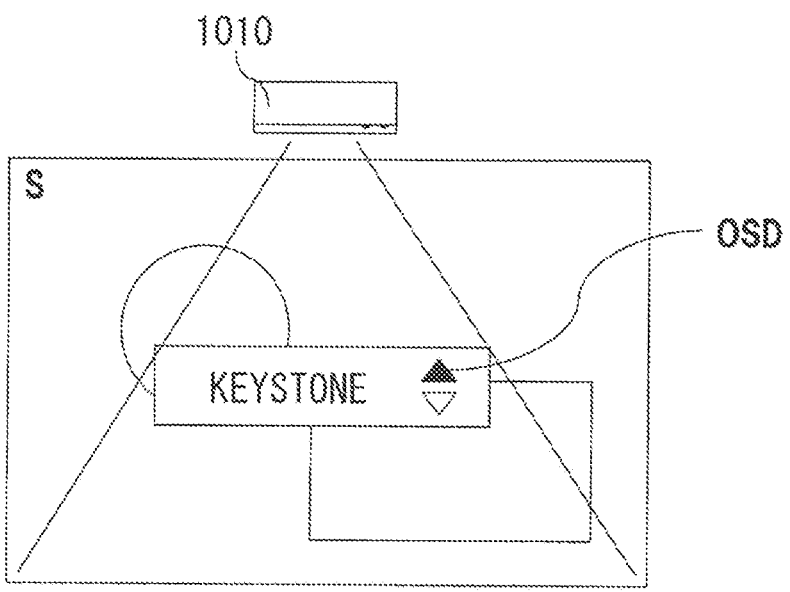

Therefore, the projection-type video-image display device 1010 displays only a right eye image (or only a left eye image) while an OSD is being displayed. As shown in FIG. 29B, the entire image projected becomes a plane image by superimposing the OSD on the right eye image.

The opening and closing timing may be controlled so that the shutter glasses 1060 and 1070 are fully opened while the OSD is being displayed so that the image is not perceived as a stereoscopic image. The right-eye-side shutter 1063 and the left-eye-side shutter 1064 may be opened or closed at the same timing so that only the right eye image (or the left eye image) can be viewed. In the former case, the image is a double image. In the latter case, the image can be enjoyed as a plane image.

(Exemplary Variation of the Projection-Type Image Display Device)

Figure 30:
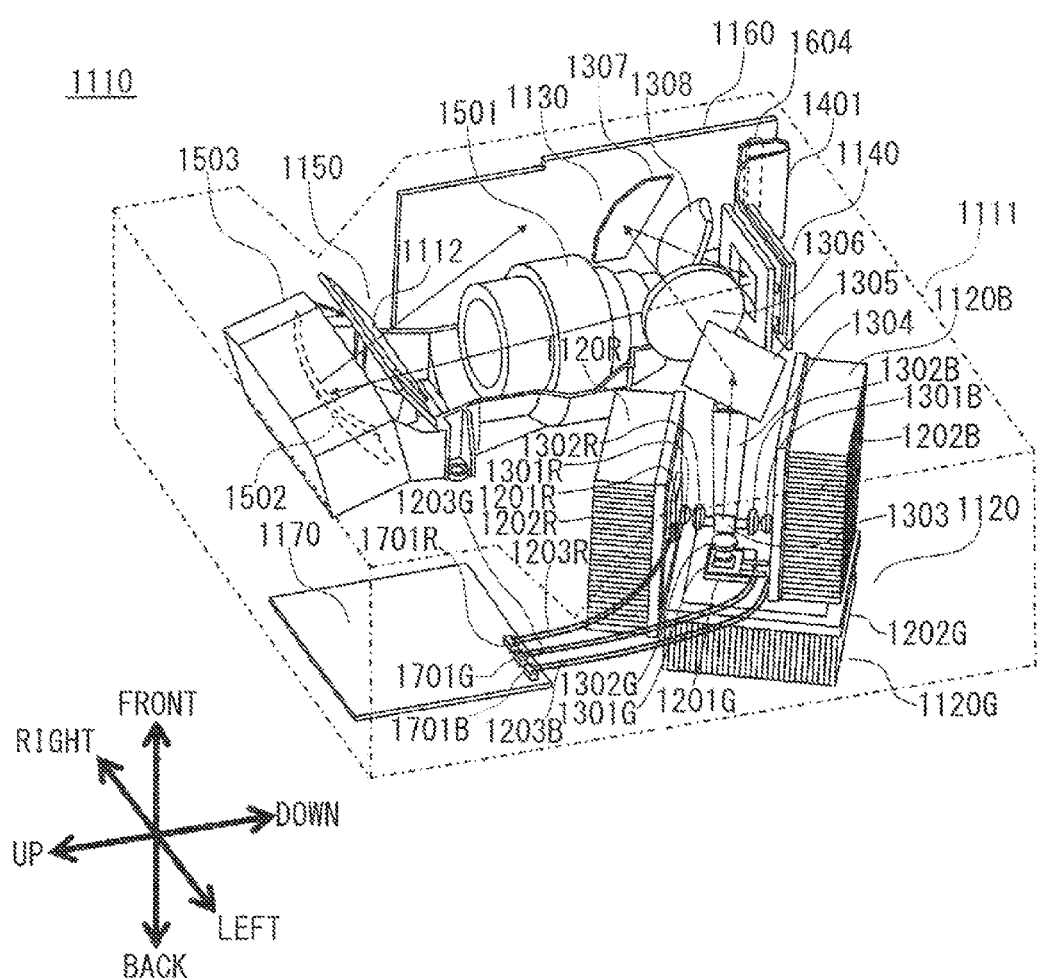
FIG. 30 is another diagram illustrating the internal configuration of the projection-type video-image display device.

FIG. 30 is a diagram illustrating the internal configuration of a projection-type video-image display device 1110 according to an exemplary variation of the third embodiment. In FIG. 30, a housing 1111 is shown in a dashed-dotted line for convenience sake. In the housing 1111, a light source device 1120, a light-guiding optical system 1130, a DMD 1140, a projection optical system unit 1150, a control circuit 1160, and an LED drive circuit 1170 are provided.

The light source device 1120 has three light source units 1120R, 1120G, and 1120B. The red light source unit 1120R comprises a red light source 1201R that emits light in a red wavelength range (hereinafter, referred to as "R light") and a heatsink 1202R for releasing heat generated in the red light source 1201R. The green light source unit 1120G comprises a green light source 1201G that emits light in a green wavelength range (hereinafter, referred to as "G light") and a heatsink 1202G for releasing heat generated in the green light source 1201G. The blue light source unit 1120B comprises a blue light source 1201B that emits light in a blue wavelength range (hereinafter, referred to as "B light") and a heatsink 1202B for releasing heat generated in the blue light source 1201B.

The light sources 1201R, 1201G, and 1201B are high-power type light sources and are configured by LEDs (a red LED, a green LED, and a blue LED) arranged on a substrate. The red LED is formed of, for example, AlGaInP (aluminum indium gallium), and the green LED and the blue LED are formed of, for example, GaN (gallium nitride).

The light-guiding optical system 1130 comprises: first lenses 1301R, 1301G, and 1301B that are provided and second lenses 1302R, 1302G, and 1302B both in correspondence to the light sources 1201R, 12016, and 1201B, respectively; a dichroic prism 1303; a hollow rod integrator (hereinafter, abbreviated as hollow rod) 1304; two mirrors 1305 and 1307; and two relay lenses 1306 and 1308.

The R light, G light, and B light that are emitted from the light sources 1201R, 1201G, and 1201B, respectively, are converted into parallel light by the first lenses 1301R, 1301G, and 1301B and the second lenses 1302R, 1302G, and 1302B, and an optical path is synthesized by the dichroic prism 1303.

The light (R light, B light, and G light) emitted from the dichroic prism 1303 enters the hollow rod 1304. The inside of the dichroic prism 1304 is hollow, and the internal surface thereof is a mirror surface. The hollow rod 1304 is taper-shaped where the cross-sectional area increases towards the output end surface side from the light incident end surface side. In the hollow rod 1304, the light is repeatedly reflected by the mirror surface, and the illumination distribution at the output end surface is uniformized.

Since the hollow rod 1304 has a smaller refraction index than that of a solid-core rod integrator (the refraction index of the air is smaller than the refraction index of glasses), the rod length can thus be made short.

The light emitted from the hollow rod 1304 is radiated on a DMD 1140 by the reflection by the mirrors 1305 and 1307 and by the lens effect of the relay lenses 1306 and 1308.

The DMD 1140 is provided with a plurality of micromirrors that are arranged in a matrix. One micromirror forms one pixel. Based on DMD drive signals that correspond to the incident R light, G light, and B light; the micromirror is driven ON/OFF at high speed.

Switching the inclination angle of the micromirror modulates the light (R light, B light, and G light) from the light sources 1201R, 1202G, and 1202B. More specifically, when a micromirror of a given pixel is in an OFF state, the light reflected by the micromirror does not enter a lens unit 1501. On the other hand, when a micromirror is in an ON state, the light reflected by the micromirror enters the lens unit 1501. The gradation of the image is adjusted on a pixel-by-pixel basis by adjusting the proportion of time in which a micromirror is in an ON state.

The projection optical system unit 1150 comprises a lens unit 1501, a curved mirror 1502, and a housing 1503 that houses the lens unit 1501 and the curved mirror 1502. The light (video image light) modulated by the DMD 1140 passes through the lens unit 1501 and is then emitted to the curved mirror 1502. The video-image light is reflected by the curved mirror 1502 and emitted to the outside from the projection window 1112 formed on the housing 1503.

[Exemplary Example of Glasses]

Figure 31:
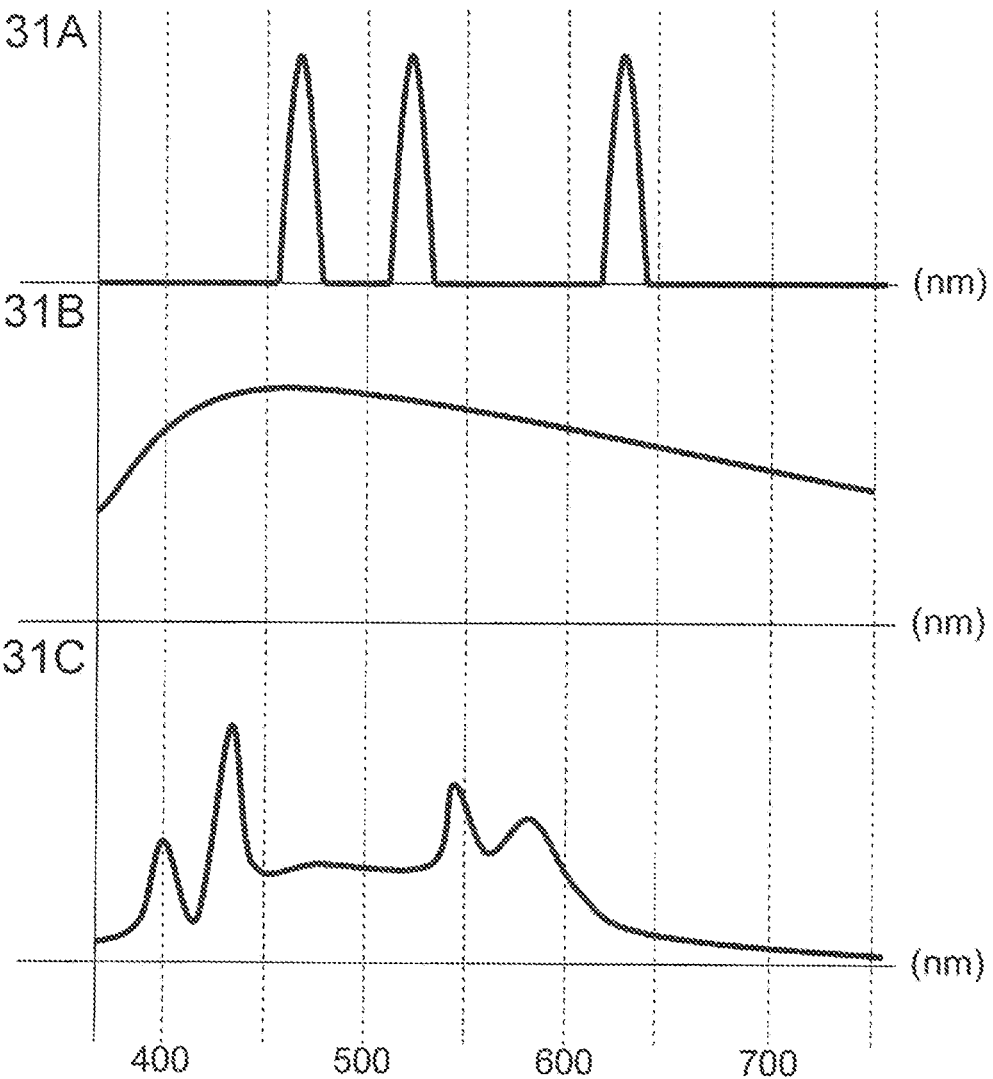
FIGS. 31A-C are diagrams illustrating an effect of outside light on the image display system.

In the case of the projection-type video-image display device 1110, the spectrum of the light source device 1120 shows a property as shown in FIG. 31A. Also, the effect of outside light cannot be disregarded in consideration of a scene where the image display system 1100 is used. For example, possible situations are the use in a place where natural sun light is radiated and the use in a room where a fluorescent lamp is provided. FIG. 31B is a diagram showing a spectrum property of the sun light, and FIG. 31C is a diagram showing a spectrum property of fluorescent light (neutral color).

Figure 32:
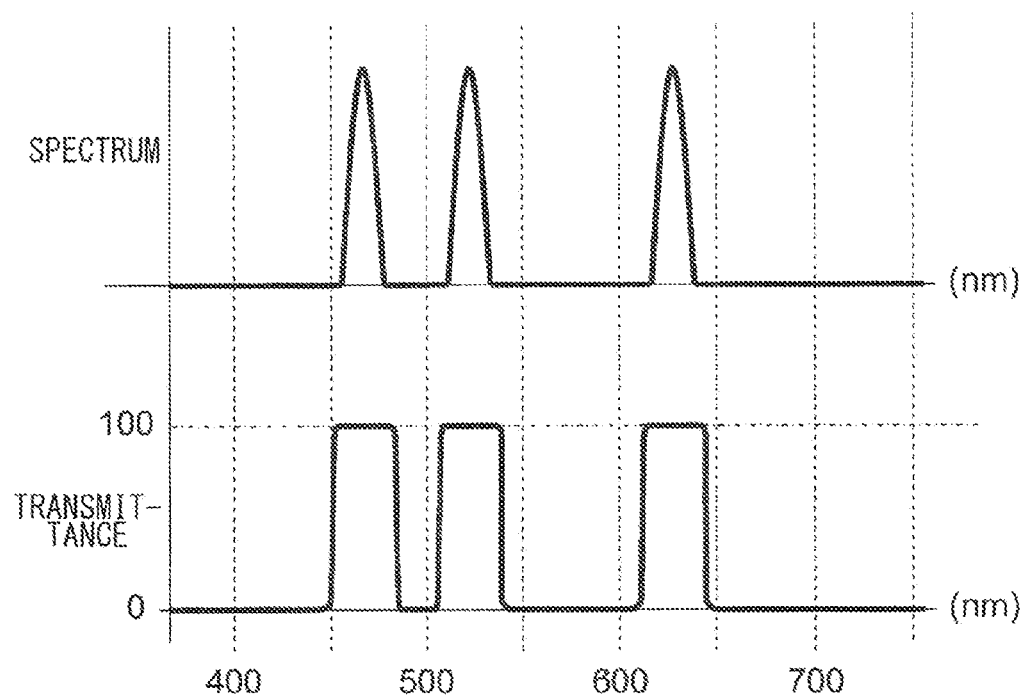
FIG. 32 is a diagram illustrating another configuration of shutter glasses.

The outside light is superimposed on a video image light, leading to the decrease in the contrast feeling of the image. As shown in FIG. 32, optical filters having high transparent characteristic, in a wavelength range corresponding to the peak wavelength of the spectrum of the light source device 1120, are attached to the shutter glasses 1060 and 1070. Due to the effects of the optical filters, the most light from the light source device 1120 passes through the glasses and reach the eyes; however, only the outside light in a certain wavelength range can pass through the glasses. Therefore, the contrast feeling of the image is improved.

Described above is an explanation based on some embodiments of the present invention. These embodiments are intended to be illustrative only, and it will be obvious to those skilled in the art that various modifications to constituting elements and processes could be developed and that such modifications are also within the scope of the present invention.

What is claimed is:

1. A stereoscopic-image display device that projects a stereoscopic image on a projection plane and displays the stereoscopic image comprising:
    a projection unit which projects and displays a parallax image formed of a first image and a second image having predetermined parallax relative to the first image in a predetermined display area; and
    a display size determination unit which determines whether or not the size of the display area in the projection plane is equal to or larger than an upper-limit size that is determined based on the threshold value of the amount of parallax that allows the parallax image to be perceived as a stereoscopic image; and
    an adjusting unit which adjusts the stereoscopic image so as to reduce the amount of parallax when the size of the display area is equal to or larger than the upper-limit size,
    wherein the adjusting unit reduces the amount of parallax by decreasing the size of the display area.

2. The stereoscopic-image display device according to claim 1 wherein the adjusting unit reduces the amount of parallax by moving the first image and the second closer to each other.

3. A stereoscopic-image display device: that projects a stereoscopic image on a projection plane and displays the stereoscopic image, comprising:
    a projection unit which projects and displays a parallax image formed of a first image and a second image having predetermined parallax relative to the first image in a predetermined display area;
    a display size determination unit which determines whether or not the size of the display area in the projection plane is equal to or larger than an upper-limit size that is determined based on the threshold value of the amount of parallax that allows the parallax image to be perceived as a stereoscopic image; and
    a camera which captures the image of the display area,
    wherein the display size determination unit computes the size of the display area based on the area, in an image captured by the camera, occupied by the display area.

4. The stereoscopic-image display device according to claim 1 wherein the display size determination unit sets, as the upper-limit size, the size of the display area obtained when the amount of parallax between the first image and the second image and the threshold value of the amount of parallax that is pre-set become equal.

5. The stereoscopic-image display device according to claim 4 wherein the display size determination unit performs corresponding point matching on the first image and the second image and uses the maximum distance between corresponding points as the amount of parallax between the first image and the second image.

6. The stereoscopic-image display device according to claim 3 wherein the display size determination unit sets, as the upper-limit size, the size of the display area obtained when the amount of parallax between the first image and the second image and the threshold value of the amount of parallax that is pre-set become equal.

7. The stereoscopic-image display device according to claim 6 wherein the display size determination unit performs corresponding point matching on the first image and the second image and uses the maximum distance between corresponding points as the amount of parallax between the first image and the second image.

* * * * *